(12) United States Patent
Kelly et al.

(10) Patent No.: US 8,702,995 B2
(45) Date of Patent: *Apr. 22, 2014

(54) CONTROLLED RELEASE OF MICROBIOCIDES

(75) Inventors: Dennis R. Kelly, Chicago,, IL (US); David Alan Little, Newton, PA (US); Magesh Sundaram, Chicago, IL (US)

(73) Assignee: Dober Chemical Corp., Woodridge, IL (US)

( * ) Notice: Subject to any disclaimer, the term of this patent is extended or adjusted under 35 U.S.C. 154(b) by 549 days.

This patent is subject to a terminal disclaimer.

(21) Appl. No.: 12/154,899

(22) Filed: May 27, 2008

(65) Prior Publication Data

US 2009/0294345 A1    Dec. 3, 2009

(51) Int. Cl.
*C02F 1/50*    (2006.01)
*B01D 35/00*    (2006.01)

(52) U.S. Cl.
USPC ... 210/764; 210/198.1; 210/206; 210/321.84; 422/277; 137/268

(58) Field of Classification Search
USPC ................ 210/120, 750, 764, 167.11, 167.3, 210/198.1, 206, 321.84; 422/261, 263, 265, 422/266, 274, 275, 276, 277, 278; 137/268
See application file for complete search history.

(56) References Cited

U.S. PATENT DOCUMENTS

| | | |
|---|---|---|
| 2,280,792 A | 4/1942 | Bruson |
| 2,754,330 A | 7/1956 | Schreyer |
| 2,782,240 A | 2/1957 | Hefner et al. |
| 2,841,479 A | 7/1958 | Hefner er al. |
| 2,928,877 A | 3/1960 | Jaul et al. |
| 2,955,028 A | 10/1960 | Beavans |
| 3,087,436 A | 4/1963 | Dettlof et al. |
| 3,172,892 A | 3/1965 | Le Suer et al. |
| 3,215,707 A | 11/1965 | Rense |
| 3,231,587 A | 1/1966 | Rense |
| 3,272,746 A | 9/1966 | Le Suer et al. |
| 3,275,554 A | 9/1966 | Wagenaar |
| 3,336,223 A | 8/1967 | Kneeland |

(Continued)

FOREIGN PATENT DOCUMENTS

| | | |
|---|---|---|
| EP | 0279863 | 8/1988 |
| EP | 0448365 | 9/1991 |

(Continued)

OTHER PUBLICATIONS

International Search Report and Written Opinion mailed Aug. 19, 2009 in PCT Application No. PCT/US09/03228.

(Continued)

*Primary Examiner* — Lucas Stelling
(74) *Attorney, Agent, or Firm* — Stout, Uxa, Buyan & Mullins; Frank J. Uxa

(57) ABSTRACT

A container for releasing a microbiocide component into a liquid composition susceptible to unwanted microbial growth (LCMG) includes a LCMG impermeable casing separate and apart from an internal combustion engine filter housing, and having a hollow interior and at least one opening. A microbiocide component, for example, at least one LCMG-soluble microbiocide, as the only active material located in the hollow interior. At least one liquid permeable element, for example, a membrane member, is provided at or near an opening in the casing and is effective to provide for release of microbiocide component into the LCMG. Methods of releasing microbiocide component into LCMGs are also provided.

20 Claims, 4 Drawing Sheets

(56) References Cited

U.S. PATENT DOCUMENTS

| | | | |
|---|---|---|---|
| 3,361,673 | A | 1/1968 | Stuart et al. |
| 3,368,972 | A | 2/1968 | Otto |
| 3,413,347 | A | 11/1968 | Worrel |
| 3,422,157 | A | 1/1969 | Kaufman et al. |
| 3,438,757 | A | 4/1969 | Honnen et al. |
| 3,440,029 | A | 4/1969 | Little et al. |
| 3,454,555 | A | 7/1969 | van der Voort et al. |
| 3,454,607 | A | 7/1969 | Le Suer et al. |
| 3,565,804 | A | 2/1971 | Honnen et al. |
| 3,574,576 | A | 4/1971 | Honnen et al. |
| 3,598,738 | A | 8/1971 | Biswell et al. |
| 3,649,229 | A | 3/1972 | Otto |
| 3,671,511 | A | 6/1972 | Honnen et al. |
| 3,697,574 | A | 10/1972 | Piasek et al. |
| 3,710,942 | A | 1/1973 | Rosenberg |
| 3,715,037 | A | 2/1973 | Shin-En Hu |
| 3,725,277 | A | 4/1973 | Worrel |
| 3,726,882 | A | 4/1973 | Traise et al. |
| 3,749,247 | A | 7/1973 | Rohde |
| 3,755,433 | A | 8/1973 | Miller et al. |
| 3,756,793 | A | 9/1973 | Robinson |
| 3,790,359 | A | 2/1974 | Feldman |
| 3,822,289 | A | 7/1974 | Clark et al. |
| 3,849,085 | A | 11/1974 | Kreuz et al. |
| 3,877,899 | A | 4/1975 | Bundy et al. |
| 3,880,569 | A | 4/1975 | Bannister et al. |
| 3,912,764 | A | 10/1975 | Palmer, Jr. |
| 3,932,537 | A | 1/1976 | Wetzel et al. |
| 3,954,808 | A | 5/1976 | Elliott et al. |
| 3,977,992 | A | 8/1976 | Hofacker |
| 3,980,589 | A | 9/1976 | Murrell et al. |
| 3,999,960 | A | 12/1976 | Langer, Jr. et al. |
| 4,026,809 | A | 5/1977 | Lachowicz et al. |
| 4,032,700 | A | 6/1977 | Song et al. |
| 4,034,756 | A | 7/1977 | Higuchi et al. |
| 4,066,559 | A | 1/1978 | Rohde |
| 4,075,097 | A | 2/1978 | Paul |
| 4,075,098 | A | 2/1978 | Paul et al. |
| 4,110,349 | A | 8/1978 | Cohen |
| 4,125,382 | A | 11/1978 | O'Brien et al. |
| 4,129,421 | A | 12/1978 | Webb |
| 4,137,185 | A | 1/1979 | Gardiner et al. |
| 4,156,061 | A | 5/1979 | Pappas et al. |
| 4,214,994 | A | 7/1980 | Kitano et al. |
| 4,222,746 | A | 9/1980 | Sweeney et al. |
| 4,231,759 | A | 11/1980 | Udelhofen et al. |
| 4,234,435 | A | 11/1980 | Meinhardt et al. |
| 4,238,628 | A | 12/1980 | Cahill et al. |
| 4,247,301 | A | 1/1981 | Honnen |
| 4,261,704 | A | 4/1981 | Langdon |
| 4,265,748 | A | 5/1981 | Villani et al. |
| 4,294,586 | A | 10/1981 | Cox, Jr. |
| 4,320,019 | A | 3/1982 | Hayashi |
| 4,323,714 | A | 4/1982 | Malloy et al. |
| 4,326,972 | A | 4/1982 | Chamberlin, III |
| 4,357,236 | A | 11/1982 | Krueger |
| 4,357,250 | A | 11/1982 | Hayashi |
| 4,365,973 | A | 12/1982 | Irish |
| 4,369,112 | A | 1/1983 | Vincent et al. |
| 4,370,305 | A | 1/1983 | Affonso |
| 4,379,065 | A | 4/1983 | Lange |
| 4,444,730 | A | 4/1984 | Renders et al. |
| 4,460,379 | A | 7/1984 | Sweeney et al. |
| 4,469,908 | A | 9/1984 | Burress |
| 4,489,857 | A * | 12/1984 | Batlas ................. 222/179 |
| 4,515,740 | A | 5/1985 | Schuettenberg et al. |
| 4,561,981 | A | 12/1985 | Characklis |
| 4,639,255 | A | 1/1987 | Schuettenberg et al. |
| 4,658,078 | A | 4/1987 | Slaugh et al. |
| 4,662,387 | A | 5/1987 | King, Sr. |
| 4,663,063 | A | 5/1987 | Davis |
| 4,668,834 | A | 5/1987 | Rim et al. |
| 4,673,527 | A | 6/1987 | Goudy, Jr. et al. |
| 4,702,270 | A * | 10/1987 | King, Sr. ................. 422/265 |
| 4,708,809 | A | 11/1987 | Davis |
| 4,717,495 | A | 1/1988 | Hercamp et al. |
| 4,728,452 | A | 3/1988 | Hansen |
| 4,740,321 | A | 4/1988 | Davis et al. |
| 4,755,189 | A | 7/1988 | Feldman |
| 4,756,844 | A | 7/1988 | Walles et al. |
| 4,782,891 | A | 11/1988 | Cheadle et al. |
| 4,849,569 | A | 7/1989 | Smith, Jr. |
| 4,857,073 | A | 8/1989 | Vataru et al. |
| 4,862,908 | A | 9/1989 | Payer |
| 4,892,562 | A | 1/1990 | Bowers et al. |
| 4,900,441 | A * | 2/1990 | Graus et al. ................. 210/446 |
| 4,904,401 | A | 2/1990 | Ripple et al. |
| 4,937,299 | A | 6/1990 | Ewen et al. |
| 4,980,075 | A | 12/1990 | Dobrez et al. |
| 4,981,602 | A | 1/1991 | Ripple et al. |
| 5,019,669 | A | 5/1991 | Adams et al. |
| 5,032,259 | A | 7/1991 | He et al. |
| 5,050,549 | A | 9/1991 | Sturmon |
| 5,053,152 | A | 10/1991 | Steckel |
| 5,059,217 | A | 10/1991 | Arroyo et al. |
| 5,071,919 | A | 12/1991 | DeGonia et al. |
| 5,089,041 | A | 2/1992 | Thompson et al. |
| 5,094,666 | A | 3/1992 | Feldman et al. |
| 5,120,349 | A | 6/1992 | Stewart et al. |
| 5,137,978 | A | 8/1992 | Degonia et al. |
| 5,137,988 | A | 8/1992 | Matzner et al. |
| 5,160,648 | A | 11/1992 | Steckel |
| 5,186,732 | A | 2/1993 | Thompson et al. |
| 5,192,335 | A | 3/1993 | Cherpeck |
| 5,230,714 | A | 7/1993 | Steckel |
| 5,235,936 | A | 8/1993 | Kracklauer |
| 5,249,552 | A | 10/1993 | Brooks |
| 5,286,823 | A | 2/1994 | Rath |
| 5,290,442 | A * | 3/1994 | Clack ................. 210/257.1 |
| 5,296,154 | A | 3/1994 | Steckel |
| 5,300,701 | A | 4/1994 | Cherpeck |
| 5,324,800 | A | 6/1994 | Welborn, Jr. et al. |
| 5,332,407 | A | 7/1994 | Herbstman |
| 5,336,278 | A | 8/1994 | Adams et al. |
| 5,337,705 | A | 8/1994 | Lane |
| 5,346,965 | A | 9/1994 | Dever et al. |
| 5,368,615 | A | 11/1994 | Steckel |
| 5,372,942 | A | 12/1994 | McGarrity et al. |
| 5,407,594 | A | 4/1995 | Fry et al. |
| 5,408,018 | A | 4/1995 | Rath |
| 5,435,346 | A | 7/1995 | Tregidgo et al. |
| 5,456,217 | A | 10/1995 | Thunker et al. |
| 5,458,793 | A | 10/1995 | Adams et al. |
| 5,483,327 | A | 1/1996 | Taya et al. |
| 5,496,383 | A | 3/1996 | Franz et al. |
| 5,507,942 | A | 4/1996 | Davis |
| 5,508,356 | A | 4/1996 | Dever et al. |
| 5,527,452 | A | 6/1996 | Grigoriev et al. |
| 5,565,106 | A | 10/1996 | Sherbondy et al. |
| 5,567,845 | A | 10/1996 | Franz et al. |
| 5,573,557 | A | 11/1996 | Thünker et al. |
| 5,580,359 | A | 12/1996 | Wright |
| 5,591,330 | A | 1/1997 | Lefebvre |
| 5,620,949 | A | 4/1997 | Baker et al. |
| 5,643,351 | A | 7/1997 | Lew et al. |
| 5,662,795 | A | 9/1997 | Pickens et al. |
| 5,662,799 | A | 9/1997 | Hudgens et al. |
| 5,662,803 | A | 9/1997 | Young |
| 5,662,808 | A | 9/1997 | Blaney et al. |
| 5,663,457 | A | 9/1997 | Kolp |
| 5,674,950 | A | 10/1997 | Thaler |
| 5,691,422 | A | 11/1997 | Emert et al. |
| 5,695,531 | A | 12/1997 | Makino et al. |
| 5,695,545 | A | 12/1997 | Cho et al. |
| 5,696,060 | A | 12/1997 | Baker et al. |
| 5,696,067 | A | 12/1997 | Adams et al. |
| 5,711,894 | A | 1/1998 | Miyake et al. |
| 5,713,384 | A * | 2/1998 | Roach et al. ................. 422/277 |
| 5,718,836 | A | 2/1998 | Nakatani et al. |
| 5,739,356 | A | 4/1998 | Dietz et al. |
| 5,741,433 | A | 4/1998 | Mitchell et al. |
| 5,752,989 | A | 5/1998 | Henly et al. |
| 5,752,991 | A | 5/1998 | Plavac |
| 5,756,435 | A | 5/1998 | Carey et al. |

(56) References Cited

U.S. PATENT DOCUMENTS

| | | | |
|---|---|---|---|
| 5,772,873 | A | 6/1998 | Hudgens et al. |
| 5,777,041 | A | 7/1998 | Emert et al. |
| 5,777,142 | A | 7/1998 | Adams et al. |
| 5,780,554 | A | 7/1998 | Emert et al. |
| 5,786,490 | A | 7/1998 | Dietz et al. |
| 5,803,024 | A | 9/1998 | Brown |
| 5,808,643 | A | 9/1998 | Tracy et al. |
| 5,810,999 | A * | 9/1998 | Bachand et al. ............... 210/206 |
| 5,829,976 | A | 11/1998 | Green |
| 5,833,722 | A | 11/1998 | Davies et al. |
| 5,840,920 | A | 11/1998 | Baker |
| 5,856,524 | A | 1/1999 | Dietz et al. |
| 5,880,219 | A | 3/1999 | Thaler et al. |
| 5,897,770 | A | 4/1999 | Hatch et al. |
| 5,919,869 | A | 7/1999 | Thaler et al. |
| 5,948,248 | A | 9/1999 | Brown |
| 6,004,582 | A | 12/1999 | Faour et al. |
| 6,010,639 | A | 1/2000 | Mitchell et al. |
| 6,017,369 | A | 1/2000 | Ahmed |
| 6,020,500 | A | 2/2000 | Baker et al. |
| 6,074,445 | A | 6/2000 | Ahmed |
| 6,114,547 | A | 9/2000 | Baker et al. |
| 6,138,703 | A | 10/2000 | Ferguson et al. |
| 6,140,541 | A | 10/2000 | Melder et al. |
| 6,183,524 | B1 | 2/2001 | Ahmed |
| 6,238,554 | B1 | 5/2001 | Martin, Jr. |
| 6,267,886 | B1 | 7/2001 | Brandreth, III |
| RE37,369 | E | 9/2001 | Hudgens et al. |
| 6,298,871 | B1 | 10/2001 | Pickens et al. |
| 6,322,694 | B1 | 11/2001 | Iliadis et al. |
| 6,565,743 | B1 | 5/2003 | Poirier et al. |
| 6,827,750 | B2 | 12/2004 | Drozd et al. |
| 6,835,218 | B1 | 12/2004 | Drozd et al. |
| 6,860,241 | B2 | 3/2005 | Martin et al. |
| 6,878,309 | B2 | 4/2005 | Blakemore et al. |
| 6,919,023 | B2 | 7/2005 | Merritt et al. |
| 7,001,531 | B2 | 2/2006 | Chen et al. |
| 7,938,277 | B2 | 5/2011 | Kelly et al. |
| 2003/0053927 | A1 | 3/2003 | Drozd et al. |
| 2007/0000831 | A1* | 1/2007 | Kelly et al. ................... 210/749 |
| 2007/0102332 | A1* | 5/2007 | Bommi et al. ................. 210/266 |
| 2007/0158292 | A1 | 7/2007 | Clark et al. |
| 2007/0163968 | A1 | 7/2007 | Steimel et al. |
| 2007/0241042 | A1 | 10/2007 | Martin et al. |
| 2007/0280981 | A1 | 12/2007 | Birthisel et al. |
| 2012/0067793 | A1 | 3/2012 | Ferrari et al. |

FOREIGN PATENT DOCUMENTS

| | | |
|---|---|---|
| EP | 0476485 | 3/1992 |
| EP | 0516838 | 12/1992 |
| EP | 0573578 | 12/1993 |
| GB | 2076679 A | 12/1981 |
| GB | 2391186 | 4/2004 |
| JP | 4858633 A1 | 1/2012 |
| WO | WO9837959 | 9/1998 |

OTHER PUBLICATIONS

International Search Report and Written Opinion mailed Aug. 27, 2009 in PCT Application No. PCT/US09/03227.
International Search Report and Written Opinion mailed Aug. 27, 2009 in PCT Application No. PCT/US09/03236.
USPTO Office Action dated Feb. 16, 2010 in U.S. Appl. No. 12/154,898, filed May 27, 2008.
English language abstract of European Patent 0476485 obtained from esp@cenet website—espacenet.com.
Kelly et al., U.S. Appl. No. 12/154,955, filed May 27, 2008.
Sundaram et al., U.S. Appl. No. 12/154,900, filed May 27, 2008.
Kelly et al., U.S. Appl. No. 12/154,898, filed May 27, 2008.
Sundaram et al., U.S. Appl. No. 61/130,072, filed May 27, 2008.
Kelly et al., U.S. Appl. No. 10/701,133, filed Nov. 3, 2003.
Kelly et al., U.S. Appl. No. 11/516,150, filed Sep. 5, 2006.
USPTO Office Action dated Dec. 19, 2002 in U.S. Appl. No. 09/939,214, filed Aug. 24, 2001.
USPTO Office Action dated Jul. 1, 2003 in U.S. Appl. No. 09/939,214, filed Aug. 24, 2001.
USPTO Office Action dated Sep. 25, 2003 in U.S. Appl. No. 09/939,214, filed Aug. 24, 2001.
USPTO Office Action dated Jan. 25, 2006 in U.S. Appl. No. 10/701,133, filed Nov. 3, 2003.
USPTO Office Action dated May 3, 2006 in U.S. Appl. No. 10/701,133, filed Nov. 3, 2003.
USPTO Office Action dated Dec. 16, 2008 in U.S. Appl. No. 11/516,150, filed Sep. 5, 2006.
U.S. Patent Office Action dated Sep. 14, 2011 in U.S. Appl. No. 12/455,040, filed May 26, 2009.
U.S. Patent Office Action dated Nov. 29, 2011 in U.S. Appl. No. 12/455,041, filed May 26, 2009.
USPTO Office Action dated Oct. 13, 2010 in U.S. Appl. No. 12/154,89, filed May 27, 2008.
U.S. Patent Office Action dated May 10, 2012 in U.S. Appl. No. 12/455,040, filed May 26, 2009.
U.S. Patent Office Action dated Aug. 2, 2012 in U.S. Appl. No. 12/154,898, filed May 27, 2008.
International Search Report, PCT/US2013/031360, dated Jul. 9, 2013

* cited by examiner

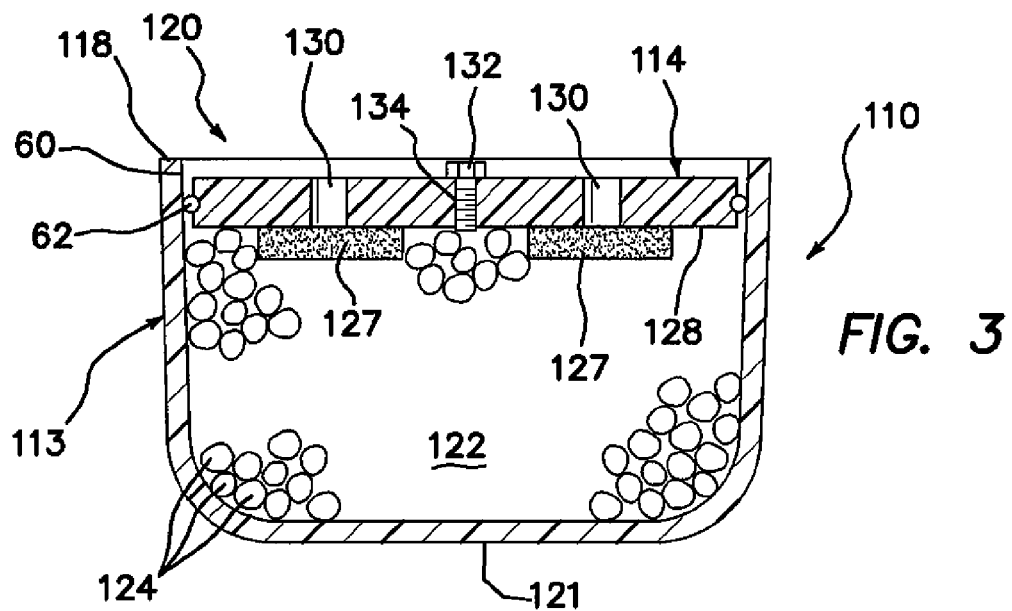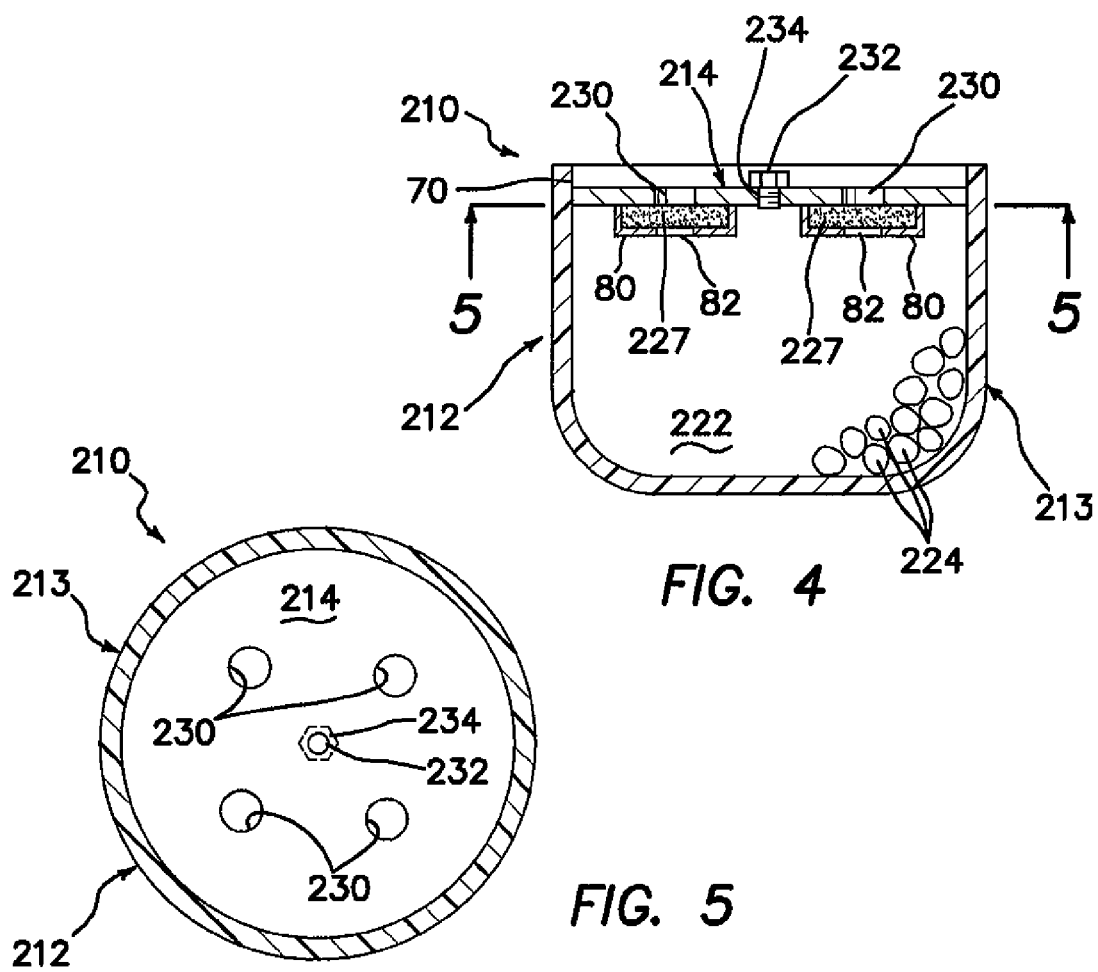

CONTROLLED RELEASE OF MICROBIOCIDES

FIELD OF THE INVENTION

The present invention relates to devices and methods for providing microbiocides or biocides to liquid compositions susceptible to unwanted microbial growth, such as liquid compositions in cooling systems, for example, but not limited to, open circulating cooling or coolant systems, such as cooling towers and the like, humidification systems, recirculated spray water systems, fire quench tanks, fuel storage tanks, and the like.

BACKGROUND OF THE INVENTION

Liquids in various systems are plagued by unwanted microbial growth due, for example to one or more of environmental conditions, composition of the liquid, exposure to atmospheric oxygen and the like factors. In an effort to mitigate this unwanted microbial growth, one or more of various chemical microbiocides or biocides typically are added periodically to the system, e.g., whenever liquid levels are adjusted and/or on a set time schedule. The terms microbiocide and biocide are used interchangeably herein. Such microbiocides include, but are not limited to, chlorine-containing microbiocides, bromine-containing microbiocides, and the like and combinations thereof. Usually, the concentration of a microbiocide in a system, which can vary due to evaporation, chemical neutralization, deactivation, degradation and the like, is not known at any given time. Instead, a predefined amount of microbiocide, for example in combination with one or more additives in a predetermined ratio, is added to the system at regular maintenance intervals or whenever liquid levels reach a point at which liquid level adjustment is required or appropriate.

Various methods of introducing additives to fluid systems, generally, have been proposed. Rohde U.S. Pat. No. 3,749,247 describes a container for releasing an oxidation inhibitor into hydrocarbon-based lubricating oil in a working engine. The oxidation inhibitor is held in a polyolefin container that permits the additive to permeate through the container wall into the oil. A further approach is described by Lefebvre U.S. Pat. No. 5,591,330, which discloses a hydrocarbon oil filter wherein oxidation additives in a thermoplastic material are mounted in a casing between a particle filtering material and a felt pad. Reportedly, the thermoplastic material dissolves in the presence of high temperature oil thereby releasing the additives. Additionally, an additive release device for use in an engine hydrocarbon fuel line is proposed by Thunker et al U.S. Pat. No. 5,456,217. The latter device comprises a partially permeable cartridge positioned in the filling neck of the fuel tank so that whenever fuel is added a portion of the additive contents of the cartridge is released into the tank.

Aqueous-based coolants present an environment distinct from those of hydrocarbon fluids. For instance, most thermoplastics do not dissolve in aqueous solutions. Moreover, relatively large quantities of additives need to be provided in a typical aqueous coolant. Sudden provision of such large amounts of additives can cause a "slug" of material to precipitate and circulate in the system, which can result in damage and failure of pump seals. Accordingly, Hudgens et al U.S. Pat. No. 5,662,799 propose an elaborate diesel engine coolant filter that filters the coolant and releases an amount of additive through a diffusion tube, or alternatively through a diffusion wafer, into the coolant. Alternative versions of this approach are proposed by Tregidgo et al U.S. Pat. No. 5,435,346 and Cheadle et al U.S. Pat. No. 4,782,891, which utilize the corrosive nature of the coolant to erode a separating means, such as a rod, in the coolant filter and release anti-corrosive material.

Glycol freezing point depressants, such as ethylene glycol and the like, at the concentrations used in internal combustion engine coolants is toxic to various microbes. In addition, such engines operate at temperatures at which most microbes are killed, even in an all water coolant that would allow microbial growth readily at room temperature. Thus, typically no microbiocides or biocides are used in the coolants of internal combustion engines.

However, other coolant compositions and other liquid compositions are susceptible to microbial growth in normal use applications.

It would be advantageous to provide relatively low cost, quickly installed apparatus and methods that release microbiocides into such other coolant compositions and other liquid compositions susceptible to microbial growth at sustained rates to allow such compositions to function effectively without becoming unduly contaminated or otherwise significantly detrimentally affected by unwanted microbial growth.

SUMMARY OF THE INVENTION

New apparatus and methods for providing release, preferably sustained release, of at least one microbiocide component into a liquid composition susceptible to unwanted microbial growth have been discovered. The present apparatus and methods effectively provide for gradual, preferably sustained, and more preferably substantially controlled, release of microbiocide component from the apparatus into the liquid composition, for example substantially an aqueous liquid; a liquid comprising water and at least one freezing point depressant, such as at least one glycol; substantially a non-aqueous liquid; and the like. Because the microbiocide component is released only through a limited portion of the apparatus, for example, over a relatively prolonged period of time, it has been found relatively convenient to substantially control the release rate of the microbiocide component, which release rate may be reduced relative to the release rate of one or more additive components other than the microbiocide component.

Many components of the apparatus of the invention, for example other than the microbiocide component or components, are substantially insoluble in the liquid composition susceptible to unwanted microbial growth, even at the elevated temperatures of such composition in a working environment, so that these components remain intact and do not dissolve into and/or otherwise detrimentally affect the liquid composition or the system in which the liquid composition is located or employed. In addition, the insoluble components of the present apparatus may or may not be reused after release of the microbiocide component contained therein. The present apparatus are easy and straightforward to manufacture cost effectively and can easily and effectively be used in a relatively wide variety of systems/applications with little or no modification to effectively control microbial growth in the liquid composition used in the system/application in question.

In one broad aspect, the present invention is directed to microbiocide component containers for releasing microbiocide components into compositions, for example, liquid compositions, susceptible to unwanted microbial growth. The containers are often designed to provide gradual, preferably sustained, and more preferably substantially controlled, release of at least one microbiocide component into a composition susceptible to unwanted microbial growth.

The present containers comprise a casing, for example, separate and apart from an engine filter housing, which is impermeable to a liquid composition susceptible to unwanted microbial growth, hereinafter LCMG, that is to be treated using the container. The casing defines a substantially hollow interior and at least one opening, for example, located in an outermost wall of the casing. In one embodiment, the casing includes only one opening. A microbiocide or biocide component is provided or located in the interior of the casing. In one embodiment, the microbiocide or biocide component is substantially the only active material, for example, substantially the only material effective to have a significant effect or benefit on to LCMG in contact with the casing, in the hollow interior of the casing. The microbiocide or biocide component may be provided in the form of a liquid, gel, paste, or in solid form. In one particularly useful embodiment of the invention, the microbiocide or biocide component is provided as a plurality of particles, or in particulate form, for example, in the form of beads, tablets, pellets, grains, other particulate forms and mixtures thereof.

The casing and other LCMG-impermeable components of the apparatus of the present invention are preferably composed of materials selected from suitable metals, LCMG-insoluble polymeric materials, combinations thereof and mixtures thereof. Useful casings can be made of materials selected from metals, such as steel, aluminum, metal alloys and the like; polymeric materials such as polyvinyl chloride, polyethylene, polypropylene, other polyolefins, nylon, polyethylene vinyl acetate (EVA), polypropylene vinyl acetate (PVA), combinations thereof and mixtures thereof, and the like.

The containers of the present invention also include at least one LCMG-permeable element or component which is provided at or near the at least one opening of the casing. This LCMG-permeable element, for example and without limitation, comprising a membrane, is effective to provide for release of a portion of the microbiocide or biocide component in the casing into a LCMG, for example, a LCMG in contact with the casing. Such release occurs over a period of time so that a portion of the microbiocide component is retained within the casing. The release may occur at a sustained rate or even a substantially constant rate, for example, at least after the initial release of microbiocide component occurs. The microbiocide component release obtained in accordance with the present invention may involve diffusion of the microbiocide component into the LCMG, and preferably is sustained microbiocide component release.

The LCMG-permeable element(s) or component(s) may comprise any suitable LCMG-permeable structure, and all such structures are included within the scope of the present invention. In one particularly useful embodiment, the LCMG-permeable element or component comprises a membrane, such as filter members or filter media, for example, a porous or semi-permeable membrane.

The porous or semi-permeable membrane of the apparatus of the invention may be made of any suitable material that permits the desired, preferably sustained, release of the microbiocide component into the LCMG, particularly when the casing is in contact with LCMG. The membrane can be made of a LCMG-insoluble material, for instance, having irregularly-sized channels or discrete-sized pores therein. As used herein, a "porous" membrane refers generally to membranes having pores in a substantially discrete size range, such as a wire screen or filter media, for example, filter paper and the like. As used herein, a "semi permeable" membrane refers to a continuous medium, which does not have pores in a discrete size range, but instead preferably permits diffusion of molecules through narrow channels, the size of which can be difficult to measure.

In one embodiment, the membrane, for example, the porous or semi-permeable membrane, comprises one or more metals and/or glasses and/or one or more polymeric materials and/or one or more papers and/or the like, combinations thereof and mixtures thereof. Very useful membranes can be made of materials selected from polyamides, for example nylons and the like, cellulosic components, for example, cellulose acetate and other cellulosic polymers, glasses, fiber glasses, polyesters, polyurethanes, polyvinyl chloride, polyethylene vinyl acetate, polypropylene vinyl acetate, natural and synthetic rubbers, and the like, combinations thereof and mixtures thereof.

In another broad aspect, the invention is directed to methods for releasing a microbiocide or biocide component, preferably at a sustained, more preferably substantially controlled, rate into a LCMG, for example, a liquid coolant. Optionally, the LCMG can contain additives other than those being released by the apparatus of the present invention. The present methods comprise placing a container as set forth herein in contact with a LCMG. When the container is exposed to a LCMG, the LCMG passes through, for example, diffuses through, and/or at least wets the LCMG-permeable element or elements and contacts and/or comes in contact with a portion of the microbiocide component in the casing. Release, preferably sustained, substantially controlled release, of microbiocide component into the LCMG is obtained, for example, by diffusion of the microbiocide component through the LCMG-permeable element.

U.S. Pat. No. 7,001,531 is directed to somewhat related subject matter. The disclosure of this U.S. Patent is incorporated in its entirety herein by reference.

Each and every feature described herein, and each and every combination of two or more of such features, is included within the scope of the present invention provided that the features included in such a combination are not mutually inconsistent.

Additional aspects and advantages of the present invention are set forth in the following description and claims, particularly when considered in conjunction with the accompanying drawings in which like parts bear like reference numerals.

BRIEF DESCRIPTION OF THE DRAWINGS

FIG. 3 is a cross-sectional view of an additional embodiment of a microbiocide container in accordance with the present invention.

FIG. 4 is a cross-sectional view of another embodiment of a microbiocide container in accordance with the present invention.

FIG. 5 is a view taken generally along the line of 5-5 of FIG. 4.

DETAILED DESCRIPTION OF THE INVENTION

Figure 1:
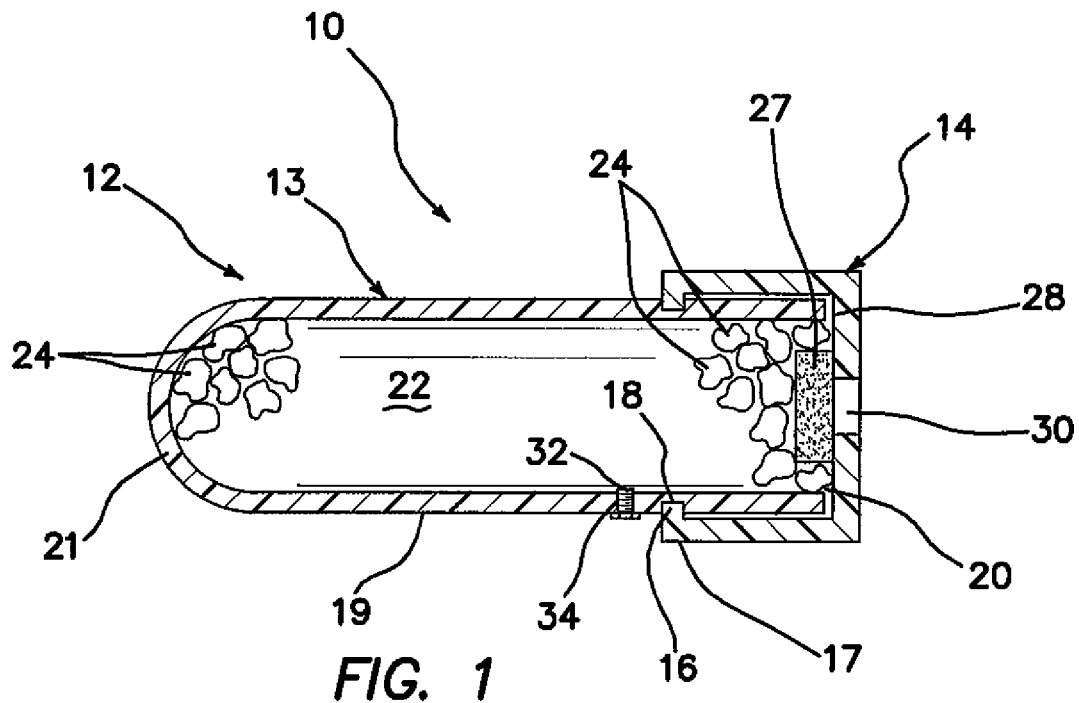
FIG. 1 is a cross-sectional view of a cylindrical shaped microbiocide container of the present invention.

The present invention is directed to containers for use in LCMG systems, including, but not limited to, such systems in or associated with heavy equipment, including both stationary and mobile equipment, as well as open circulating coolant or cooling systems, such as cooling towers and the like; humidification systems; spray water systems; fire quench tanks; storage tanks, such as fuel storage tanks and other storage tanks; industrial recirculating closed cooling systems; process fluid systems, such as cutting and/or other machining oil systems, heating fluid systems, for example, thermal heating fluid systems, and the like; swimming pools; spas; fountains; public bathing systems; drinking water systems; and the like.

Such containers are effective in gradually, over a prolonged period of time, releasing, for example, under sustained conditions, one or more microbiocide components, for example, chemical microbiocide components, into a composition, for example, a fluid composition susceptible to unwanted microbial growth, preferably a LCMG.

Representative LCMGs include, but are not limited to, liquids, such as a substantially aqueous liquids with or without one or more additives effective to benefit the LCMG and/or the system in which the LCMG is employed; substantially non-aqueous liquids; and the like.

The size and shape of the containers of the present invention are not of critical importance, provided that the size and shape of the particular container used in a particular application is sufficient or appropriate to allow the container to be effective to perform its function, that is to provide for the desired release of a microbiocide component into the LCMG, in the particular application. For example, and without limitation, the containers may range in size and shape from a bowl-shaped container about 3 inches or less to about 5 inches or more in depth and about 3 inches or less to about 6 inches or more in diameter to a cyclinder-shaped container about 2 feet or less to about 4 feet or more in length and about 2 inches or less to about 6 inches or more in diameter. The volume of the hollow interior of the casing of the present invention may be in a range of about 5 cubic inches or less or about 20 cubic inches to about 500 cubic inches or about 1500 cubic inches or more.

In general, the containers may be placed so as to contact the LCMG to be treated. For example, and without limitation, the container may be placed in a pond or pool or lake of water to be treated. In cooling systems, the containers may be placed in an open trough of flowing water. In other cases, the containers may be placed in a larger cylinder through which water is pumped, for example and without limitation, by a recirculation pump on a cooling tower. In still other cases, the containers may be placed in a sump or catch basin of a cooling tower or humidification system. The containers may be variously sized and shaped to facilitate placement in a system to allow for contact with the LCMG to be treated and release of the microbiocide component into such LCMG.

The LCMGs often initially (that is prior to treatment in accordance with the present invention) include one or more additives that provide one or more benefits to the LCMG and/or the system in which the LCMG is employed. The LCMGs which may be treated in accordance with the present invention include both aqueous compositions, that is compositions which include a major amount, such as at least about 50% or about 70% or about 80% by weight of water; and non-aqueous compositions, that is compositions which include less than about 50% or about 30% or about 10% by weight of water. The LCMG may be substantially anhydrous, or anhydrous, for example, containing about 5% by weight or less of water. Optionally, the LCMGs can contain one or more additives other than those being released by the apparatus of the present invention. These additives include, but are not limited to, such additive or additives which is (are) conventionally used in the type of LCMG in question.

The LCMG may be susceptible to unwanted growth of one or more types and/or species of microorganisms. For example, and without limitation, included among such microorganisms are bacteria, fungi, viruses, spores, and the like and combinations thereof. Such microorganisms or microbes may be present in the environment in which the LCMG is located and/or is employed. In addition, or alternatively, the LCMG may be such that the microbiocide component in the present apparatus is effective to substantially prevent any significant growth of one or more particular microorganisms, for example and without limitation, one or more microorganisms that may be introduced into the LCMG unintentionally or otherwise through human or natural intervention. In other words, the microbiocide component in the present apparatus may be employed to substantially prevent any microbial growth in the LCMG, to control the growth of one or more microorganisms in the LCMG and/or to reduce the population of one or more microorganisms in the LCMG, for example, a LCMG which is contaminated with an excessive population or amount of one or more microorganisms. Thus, the present apparatus can be used to substantially prevent microbial growth, to control microbial growth and/or to reduce microbial growth in a LCMG.

Unless otherwise expressly noted to the contrary, each of the words "include", "includes", "included" and "including," and the phrase "for example" and abbreviation "e.g." as used herein in referring to one or more things or actions means that the reference is not limited to the one or more things or actions specifically referred to.

The present containers comprise a casing, for example, a LCMG-insoluble and LCMG-impermeable casing, having or defining a substantially hollow interior. The casing has at least one opening. The casing may have any suitable shape and size, which are often chosen to be compatible with the particular application involved. The casing, for example, may have a generally cylindrical shape, a generally bowl shape or any of a large number of other shapes. The casing may have one or more curved and/or planar walls or it can have all curved or planar walls.

The at least one opening in the casing may be provided at any location or locations in the casing. For example, such opening or openings can be located at the top and/or bottom and/or ends and/or side or sides of the casing, as desired. The choice of the location for the opening or openings often is at least partially based on the particular application involved, and/or the ease and/or the cost of manufacturing the present microbiocide component containers and the like factors and may have at least some effect on the performance effectiveness of the containers.

In order to illustrate and describe the invention more clearly, cylindrically-shaped casings and bowl-shaped casings are emphasized herein. However, the present invention is not limited thereto and is applicable to casings of other shapes. Containers including such other shaped casings are included within the scope of the present invention.

In one embodiment, the casing may be cylindrical in shape, for example, having a first end and a second end. The casing is provided with at least one opening, for example at one or both of the first end and second end and/or in the side wall of the casing. The casing may be substantially bowl-shaped. For example, the bowl-shaped casing defines a hollow interior, a top, bottom and one or more side walls. The opening or openings can be located in the top, bottom and/or one or more side walls.

A microbiocide component, for example, and without limitation, comprising at least one LCMG-soluble microbiocide, is provided in the hollow interior of the casing. At least one LCMG-permeable element is provided at or near at least one opening of the casing. For example, a LCMG-permeable element advantageously is provided at or near each opening of the casing. Such LCMG-permeable element or elements are effective to provide for release of a portion of the microbial component into the LCMG in contact with the casing, for example, in a sustained manner over time while retaining a balance of microbiocide component within the casing.

The casing of the container may be made of any suitable material or materials of construction. The casing as such has substantially no detrimental effect on the microbiocide component or the LCMG or on the performance of the present container. The casing preferably is composed of a material selected from metals, such as steel, aluminum, metal alloys and the like, polymeric materials, combinations thereof and mixtures thereof. In one particularly useful embodiment, the casing is selected from metals, polyvinyl chloride (PVC), polyethylene (high density and/or low density), polypropylene (PP), nylon, polyethylene vinylacetate (EVA), polypropylene vinylacetate (PVA), polyester, acetal, polyphenylene sulfide (PPS), and the like, combinations thereof and mixtures thereof.

In one embodiment, the at least one LCMG-permeable element or component of a present container, preferably comprising at least one LCMG-permeable membrane, such as a porous or semi-permeable membrane, facilitates or permits contact of LCMG with the microbiocide component provided within the casing. The membrane may optionally be accompanied, when desired, by at least one membrane retention member or two or more retention members, for example, an open mesh screen, woven cloth and the like, effective in retaining the membrane in a substantially fixed position relative to, for example, within, the casing.

The LCMG-permeable membrane of the invention is advantageously composed of a suitable LCMG-insoluble material, preferably selected from polymeric materials, glasses, metals, combinations thereof and mixtures thereof. For example, suitable materials include, but are not limited to, glasses, polyamides, such as nylon and the like, cellulosic polymers, such as cellulose acetate and the like, polyesters, polyethylene vinylacetate (EVA), polypropylene vinylacetate (PVA), polyvinyl chloride (PVC), polyurethanes, stainless steel mesh, sintered metals (such as sintered metal discs and the like), metal membrane filters (such as silver membrane filters and the like) and the like, as well as combinations thereof and mixtures thereof. In one embodiment, the membrane comprises a material selected from cellulose; cellulose salts, for example and without limitation, cellulose acetate, cellulose sulfate, cellulose phosphate, cellulose nitrate and the like and mixtures thereof; cellulose esters; polyesters; polyamides, glasses and the like and combinations thereof.

The membrane can alternatively be a material through which a microbiocide component can pass, for example, by diffusion (although not necessarily through pores), such as silicone rubber, polyethylene, polyvinylacetate, natural and synthetic rubbers, and other polymers and waxes, and combinations thereof and mixtures thereof. Such membranes are often referred to as semi-permeable membranes. In one embodiment, a "semi-permeable membrane" refers to a continuous film of a material, for example and without limitation, a polymeric material, permeable to the LCMG, which permits diffusion of molecules through microscopic channels. The pore size of such a semi-permeable membrane is not easily measured and is typically less than about 0.2 microns.

The LCMG-permeable membrane of the present invention preferably comprises a porous membrane, advantageously a microporous membrane, such as those membranes having an average pore size within the range of about 0.2 microns or about 1 micron or about 2 microns to about 30 microns or about 40 microns to about 300 microns or more. As referred to herein, a "membrane" may be a single layer or may include multiple plies. The thickness of the membrane is preferably in a range of about 0.1 mm or less to about 0.5 mm or about 1 mm or about 5 mm or about 10 mm or more, although other thicknesses can be effectively employed. Examples of membrane materials include metal wire meshes; polymers, such as polyamides, e.g., nylon and the like, other polymers disclosed elsewhere herein and the like, meshes; filter media; combinations thereof and mixtures thereof and the like. Useful membrane materials include materials useful as filter media. Examples of such materials include the filter medium sold by Fleetguard Division of Cummins Engine under the trademark STRATOPORE and filter media available from Whatman and Millipore.

The presence of and/or size of pores in the LCMG-permeable membranes employed in accordance with the present invention may not be the controlling factor in determining the rate of release of the microbiocide component into the LCMG. Other factors which may be important, or at least have an effect, in determining the rate of release of microbiocide component into the LCMG include, but are not limited to, the membrane material of construction, the physical dimensions (for example, thickness, volume and the like) of the membrane, the presence and/or intensity (density) of the electrical charge, if any, on the membrane material, the microbiocide component being employed, the degree of hydrophilicity/hydrophobicity of the membrane material, the form of the microbiocide component and the like.

To illustrate, each of two membranes having the same physical dimensions is used in a different identical container containing the same amount of the same bromine-containing microbiocide in accordance with the present invention. Each container is used to release the microbiocide from the container into water in an identical manner and the rate of release of the microbiocide is measured. One membrane is formed of cellulose, an electrically charged material, having an average pore size of 20-25 microns. The other membrane is formed of electrically uncharged glass having an average pore size of only 5 microns. However, the glass membrane, having the smaller pores, is found to have a higher or increased microbiocide component release rate relative to the electrically charged cellulose membrane.

Thus, a number of factors may be considered in choosing or selecting the membrane material to be used in accordance with the present invention to achieve the desired microbiocide component release rate. In one embodiment, the material of construction of the membrane and the pore size of the membrane are selected to control the rate of release of the microbiocide component into the LCMG.

The microbiocide component release flux rate through the membrane is defined as milligrams of microbiocide component released per hour through one square millimeter of membrane or mg./hr./mm$^2$. Because the release flux rate varies over a wide range and is at least sometimes relatively slow, a test using benzyltriazole has been developed to quantify certain release flux rates that may be useful in accordance with the present invention. This test is conducted as follows.

A tank with twenty (20) gallons of tap water is provided, together with a recirculating heater to give mixing and temperature control. The temperature is set to 80° F. Once this temperature is reached, a container, such as shown in FIG. 1, containing benyzyltriazole is placed in the tank in contact with the water. Water samples are collected at regular intervals over a 100 hour period and are measured for benzyltriazole content. From these measurements, the benzyltriazole release flux rate of the membrane is determined. To illustrate, suppose 300 mg of benzyltriazole is released through 351 mm$^2$ of membrane area (exposed through an opening in the outermost wall of the container) in 100 hours. The benzyltriazole release flux rate $$\frac{300}{100 \times 351}$$

of 0.0085 mg./hr./mm$^2$.

Useful benzyltriazole release flux rates for membranes in accordance with the present invention may be in a range of about 0.001 or less to about 0.3 mg./hr./mm$^2$ or more, for example, in a range of about 0.002 to about 0.2 mg./hr./mm$^2$.

It should be noted that benzyltriazole release flux rates may be employed as one measurement of whether or not a membrane is useful in accordance with the present invention. However, the benzyltriazole release flux rate is not the only basis on which the usefulness of a particular membrane can be measured, determined or estimated. For example, prototyping may be employed, and other tests using the actual membrane and/or actual microbiocide to be used may be employed. Benzyltriazole release flux rates which are either too high or too low do not necessarily preclude the membrane tested from being useful in accordance with the present invention. There may be microbiocides that do not release sufficiently through membranes that have benzyltriazole release flux rates which are considered acceptable, or that release sufficiently through membranes that have benzyltriazole release flux rates which are not considered acceptable. In any event, within the limitations noted above, the benzyltriazole release flux rate has been found to be one useful tool in determining the suitability of membrane materials in the present invention.

In the event that a selected material is insufficiently rigid or stable under the conditions at which the present apparatus are used, for example and without limitation, the repeated hot-cold cycling of a cooling system, a more thermoresistant material, such as one made of ceramic, glass and the like, combinations thereof and mixtures thereof, can be employed as a membrane material of construction.

The membrane may be secured to the casing so as to cover the opening or openings in the casings, for example, so that no microbiocide component passes outside the casing without passing through the membrane. The membrane advantageously is positioned in and/or directly adjacent the opening or openings in the casing. The membrane may be adhered to the casing, using an appropriate and compatible adhesive, press fitted to the casing, interference fitted to the casing or otherwise fixedly secured to the casing.

In one embodiment, the casing defines only one opening in an outermost wall of the casing and the membrane is provided in or directly adjacent the only one opening.

As noted above, in one embodiment, the LCMG-permeable element further comprises at least one retention member. For example, the membrane may be retained across the opening of the casing by one or more wire or mesh screens, for example, stainless steel mesh screens. The membrane may be sandwiched between at least two retention members. The retention members preferably are structured, for example, so as to have a mesh size, to facilitate or permit microbiocide component from the casing to be passed, for example, by diffusion, into the LCMG in contact with the container. For instance, the retainer member or members preferably have a mesh size in the range of about 10 to about 300 microns or about 500 microns or more. A particularly preferred retention member is metal, e.g., stainless steel screening and/or woven cloth.

The microbiocide component provided within a container of the invention is effective when released into the LCMG to control, for example substantially prevent, substantially maintain, or reduce, unwanted microbial growth in the LCMG. The microbiocide component may be provided in the form of a liquid, gel, paste or solid particles, for example, beads, tablets, pellets or grains, and the like, as well as mixtures thereof, within the casing.

A microbiocide component of the invention can advantageously further comprise a coating material that at least partially surrounds or encapsulates or coats the microbiocide component, as discussed elsewhere herein. Such coating material may be provided in order to at least assist in controlling, or to control, the release of microbiocide component, as desired. The coating material may be either LCMG-soluble or LCMG-insoluble. The coating on the microbiocide component should be such as to allow or permit at least some release of the microbiocide component from the casing into the LCMG.

The microbiocide component of the present invention may include or may be located in a binder material and/or a matrix material, for example, a LCMG-insoluble biocide material and/or matrix material, such as a LCMG-insoluble polymeric material. Examples of such binder materials and matrix materials include, without limitation, cellulose, LCMG-insoluble cellulosic derivatives and the like and mixtures thereof. Other binder and matrix materials, advantageously LCMG-insoluble binder and matrix materials, useful with microbiocides, for example and without limitation, conventionally and/or commercially used with microbiocides may be employed in or with the microbiocide components of the present invention. The binder material and/or matrix material, if any, should be such as to allow or permit release of the microbiocide component from the casing into the LCMG. The binder material and/or matrix material advantageously is effective to at least assist in controlling, or to control, the release of the microbiocide component into the LCMG. In one embodiment, the microbiocide component may be present in the casing and no binder material and/or matrix material is employed.

In one embodiment, as discussed herein, the LCMG-permeable element or elements include a polymer-containing membrane, for example, a polymer-coated membrane, in order to achieve enhanced microbiocide component release control. In this latter aspect, the membrane, that is the membrane of the LCMG-permeable element or elements, is suitably coated, impregnated or otherwise associated, for example, by spray coating, dip coating and the like, with a polymer material. Suitable polymer materials include without limitation, LCMG-insoluble materials which have no significant detrimental effect on the LCMG being treated, on the microbiocide component or on the performance of the present container. Examples of such coating materials include those listed by Mitchell et al U.S. Pat. No. 6,010,639, the disclosure of which is incorporated in its entirety herein by reference. In one embodiment, the polymer material is polyethylene vinyl acetate copolymer. In addition, or alternatively, the present retention member(s) of the LCMG-permeable element or elements can be coated, impregnated, or otherwise associated with a material, for example, a coolant-insoluble polymer material, such as those disclosed in Mitchell et al U.S. Pat. No. 6,010,639, to at least assist in controlling or to control, release of the microbiocide component from the casing, as desired. Other examples of useful coatings are disclosed in Blakemore et al U.S. Pat. No. 6,878,309, the disclosure of each of the patents identified herein is incorporated in its entirety herein by reference.

The container of the present invention preferably is filled with a microbiocide component through the opening or openings of the casing or otherwise.

The containers of the invention, for example, the casings of the containers, may include one or more LCMG-impermeable cap members or LCMG-impermeable plugs, which can be detachable or removable from the casing or the remainder of the casing, for example, to facilitate filling the interior space of the casing with a microbiocide component or additive composition including a microbiocide component.

In a useful embodiment, the containers of the present invention, for example, the casings of the containers, may further include a further opening into the hollow interior; and the containers may further comprise a structure operatively coupled to the further opening. This structure may be operable to allow at least one or both of the following: (a) air to pass out of the hollow interior through the further opening; and (b) a LCMG, for example, an aqueous-based liquid or water, to pass into the hollow interior through the further opening.

Such containers are very useful in applications in which a liquid composition, such as a LCMG, aqueous-based liquid, liquid water and the like, is to be passed into the hollow interior of the container to facilitate release of the microbiocide component into the LCMG external from and/or in contact with the casing. In other words, the further opening and structure, as described herein, facilitate allowing and/or are effective in allowing, air to leave the hollow interior while a liquid, such as described herein, enters the hollow interior.

In one embodiment, the structure comprises a removable plug structured to be placed in the further opening to close the further opening. For example, the container may include a removable plug in a further opening or port in the casing, which plug can be removed to allow a liquid, such as a LCMG, aqueous-based liquid, liquid water and the like, to be introduced into the hollow interior through the further opening to wet the microbiocide component. Certain microbiocides are hydrophobic or otherwise resist wetting by the LCMG in contact with the container. In such instances, it is advantageous that water, or other LCMG, be directly introduced into the hollow interior to wet the microbiocide component and facilitate the initial release of the microbiocide component into the LCMG. In other words, without such direct introduction of water or LCMG, the microbiocide component in the hollow interior resists wetting by the LCMG in contact with the casing for an overly long period of time so that, during this long period of time, no microbiocide component is released into the LCMG. In effect, pre-wetting such microbiocide components allows for a reasonably prompt, and controlled release of the microbiocide component into the LCMG in contact with the housing. Once the water has been directly introduced into the hollow interior, the plug is repositioned in the further opening to close the further opening.

The structure may comprise a valve operable between a first position to allow air to pass out of the hollow interior through the further opening and a second position to substantially prevent air from passing out of the hollow interior through the further opening. As air leaves the hollow interior, liquid, for example, as noted elsewhere herein, may be introduced into the hollow interior, for example, through the further opening, to displace the air that has been removed. The valve may be located substantially within the hollow interior or substantially external of the hollow interior.

Any suitable valve may be employed as the structure in accordance with the present invention. Such valve should be operable and effective at the conditions at which the container is used, and should be made of materials which are compatible, that is materials which do not cause or create or have any undue or significant detrimental effect on the container during storage or use or on the LCMG being treated. Examples of useful valves include, without limitation, ball float valves, spring loaded valves and the like. The valve may be adjustable so that the internal pressure within the hollow interior, for example, produced by liquid entering the hollow interior can be controlled by adjusting the valve to obtain a desired internal pressure before the valve is opened to allow air to leave the hollow interior through the further opening in the casing.

In one embodiment, the structure may comprise an air permeable membrane member positioned over the further opening. The air permeable membrane member is structured and positioned to allow air to pass out of the hollow interior through the further opening and to substantially prevent a liquid, such as a LCMG, etc., from passing out of the hollow interior through the further opening.

The air permeable membrane member may be positioned in or covering the further opening, for example, using adhesives and/or other attachment means and/or by being interference fitted in the further opening.

The air permeable membrane member may be made of a material and/or may have properties such that the air permeable membrane member allows air to escape the hollow interior but not liquid water, LCMGs and the like. For example, the air permeable membrane member may be made of a non-wetting material and/or have a size and porosity sufficiently lower than the liquid permeable membrane described elsewhere herein to effectively not contribute to the release of the microbiocide component through the air permeable membrane member. For example, the liquid permeable membrane may have a porosity of about 20 to about 30 microns and an area of about 40 to about 60 cm and the air permeable membrane member may have a porosity of about 1 to about 10 microns and an area of about 1 to about 10 $cm^2$.

The air permeable membrane member may be made of any suitable material, for example, sufficiently durable to be effective in use with the present container and compatible with the remainder of the container and the LCMG being treated.

In a further embodiment, with the container including an opening, primarily for the release of microbiocide component into the LCMG and a further opening, the same membrane material may be used to cover both the opening and the further opening. For example, and without limitation, in a case where 51 $cm^2$ of total area is needed to get the desired release of the microbiocide component from the hollow interior, the opening would be larger, such as at least about 5 times larger in area, for example, about 45 cm², than the further opening, for example, about 6 cm². In this embodiment, it would be advantageous to place the larger opening below or down stream of the smaller, further opening. In this embodiment, the membrane material employed to cover both the opening and the further opening advantageously is suitable as a material for the liquid permeable membrane member.

In one embodiment of the present invention wherein the casing is substantially cylindrical shaped and the opening or openings are located at the end or ends of the casing, one or both ends of the casing may include a cap member, with at least one of the cap members being removable to allow the casing or cartridge to be filled or refilled with a microbiocide component. Another open end of the casing, if desired, may include a cap member that is permanently sealed thereto, for example, during manufacture, for example, during injection molding of the container. Whenever the cap or plug is attached by threading or screwing it onto the casing, screw threads can be applied to the respective pieces during or after molding with suitable dies or within the mold. The cap member can alternatively be applied to the casing by a press fit. In this case, suitable tolerances to make a snap fit between the casing and the end piece can be provided, for example, to the plastic injection molds used to make the respective pieces. The end piece can also be formed integrally with the casing, e.g., during injection molding.

The cap or end piece used to close at least one end of the casing containing the microbiocide component typically is provided with at least one opening to permit release of the microbiocide component therethrough, and to provide fluid communication between the LCMC located exterior to the container and the microbiocide component disposed within the casing interior. Whenever an end piece is formed integrally with the casing, the opening can be provided therein during or after formation of the casing, for example, by injection molding.

It will be appreciated by those of skill in the art that release of the microbiocide component into a LCMG utilizing a container of the present invention is provided, and the release rate may be substantially controlled by consideration of several factors. The following factors, as well as others, may also have an effect on the performance and effectiveness of the containers of the present invention. For example, a desired microbiocide component release rate may be obtained by appropriate selection of: the number and type of membrane layers; membrane composition; membrane pore size, if any; the presence, type and amount, if any, of polymer associated with, e.g., coated, on the membrane; and the presence, type and amount, if any, of the coating on the microbiocide component. The rate of release may also be influenced by the number and size of openings in the casing and the like. Other factors to be considered include, among others, the type and form of the microbiocide component, the solubility of the microbiocide component in the LCMG to be treated, the temperature of the LCMG to be treated, and the velocity of the LCMG through the LCMG line or system to be treated and the like factors.

Further contemplated within the invention is a method for releasing a microbiocide component, preferably at a controlled rate, into a LCMG. The method comprises placing in contact with the LCMG a container or cartridge as described herein containing the microbiocide component. The container or cartridge configuration described herein preferably permits a release, preferably a controlled release, of microbiocide component from the casing interior into the LCMG. It is contemplated that, in some configurations, the LCMG is permitted to flow around and encircle the casing containing the microbiocide component. However, even in these configurations, release of microbiocide component is preferably sustained and/or controlled, for example, by diffusion, for example, passive diffusion, rather than by forced flow of LCMG through the casing.

A microbiocide component for use in a container or cartridge of the invention preferably is provided as a liquid, gel, paste or as particles, for example, beads, tablets, pellets, grains, coated versions of these, and the like, as well as mixtures thereof. The particles have a physical size large enough to prevent passage through the LCMG-permeable components of the invention as described elsewhere herein.

A microbiocide component for use with the present invention is such as to be effective to serve some beneficial function within the LCMG and/or the system in which the LCMG is used or employed. In one embodiment, the microbiocide component is effective in controlling unwanted microbial growth in the LCMG and/or in the system in which the LCMG is used or employed. As noted elsewhere herein, the microbiocide component may be effective in preventing unwanted microbial growth in the LCMG and/or system, in reducing unwanted microbial growth, that is reducing the population of unwanted microbes, in the LCMG and/or system, and/or in maintaining the population of unwanted microbes in the LCMG and/or system at an acceptable or tolerable level. In short, the microbiocide component has an effect on the population of unwanted microbes in a LCMG and/or a system using or employing a LCMG relative to the population of such microbes in an identical LCMG and/or system without the microbiocide component being present.

In a useful embodiment, the microbiocide component is substantially the only active material in the hollow interior of the casing. That is, the microbiocide component is substantially the only material in the interior of the casing which, when released from the casing, is effective to have a significant or measurable effect on the LCMG in contact with the casing and/or on the system in which the LCMG is located. For example, one or more materials, such as corrosion inhibitors, oxidation inhibitors, foam inhibitors, cavitation liner, pitting/corrosion inhibitors, deposition and scale inhibitors, dispersants, organic acids, and/or anti-gel agents are advantageously not present in the hollow interior with the microbiocide component. Delayed and/or sustained and/or controlled release coatings, fillers, and matricies associated with the microbiocide component in the hollow interior of the casing are not considered active materials in the context of this paragraph.

The microbiocide component is often present in an amount of at least about 30% by weight of the material present in the hollow interior of the casing. Advantageously, the microbiocide component is present as a major amount, that is at least about 50% by weight, of the material in the hollow interior of the casing. The microbiocide component may be at least about 70% by weight or at least about 90% by weight or more of the material present in the hollow interior of the casing.

Any suitable, for example and without limitation, effective, microbiocide or biocide component may be employed in accordance with the present invention. In one useful embodiment, the microbiocide component is an U.S. Environmental Protection Agency (EPA) registered microbiocide component or is included in an U.S. EPA registered microbiocide composition.

Advantageously, the microbiocide component is compatible with the container or cartridge, and its component parts, in which it is placed, with the LCMG to be treated, and with the system in which the LCMG is used or employed. For example, and without limitation, the microbiocide component may be selected so as not to be unduly degraded or damaged by, and not to cause undue degradation or damage to, the container, the LCMG to be treated and the system in which the LCMG is used or employed. In addition, the microbiocide component may be selected to be effective in controlling the microbe or microbes, for example, the specific microbe or microbes, present in the LCMG to be treated and/or in the system in which the LCMG is used or employed. Such microbes may include, without limitation, bacteria, viruses, fungi, spores and the like, many of which, if left to reproduce or grow without control, are known to contaminate, foul or otherwise adversely affect the appearance and/or performance of LCMGs and/or the systems in which LCMGs are used or employed.

Examples of useful microbiocide components include, without limitation, halogen-containing microbiocides, such as microbiocides which include combined halogen, for example, chlorine-containing microbiocides, bromine-containing microbiocides and the like and mixtures thereof; halogen-releasing microbiocides, such as materials, for example, materials which include releasable halogen, which release microbicidally effective amounts of halogens, e.g., chloride, bromine and the like, into LCMGs and the like and mixtures thereof; thiocarbamate microbiocides and the like and mixtures thereof; thiazoline microbiocides and the like and mixtures thereof; thiocyano microbiocides and the like and mixtures thereof; sulfate microbiocides and the like and mixtures thereof; quaternary ammonium microbiocides and the like and mixtures thereof; metal-containing microbiocides and the like and mixtures thereof; and the like and mixtures thereof.

Specific examples of useful microbiocide components include, without limitation: 5-chloro-2-methyl-4-isothiazolin-3-one; 2-methyl-4-isothiazoline-3-one; methylene-bis(thiocyanate); sodium dimethyldithiocarbamate; disodium ethylene-bis-dithiocarbamate; trichloro-s-triazinetrione (trichloroisocyanurates); potassium peroxymonosulfate; potassium bisulfate; n-alkyl dimethyl benzyl ammonium chloride; bis(tri-n-butyltin)oxide; poly(oxyethylene(dimethyliminio))ethylene(dimethyliminio-ethylene dichloride); 2,2-dibromo-3-nitrilopropionamide (DBNPA); 1-bromo-3-chloro-5,5-dimethylhydantoin; 1,3-dichloro-5, 5-dimethylhydantoin; 1,3-dichloro-5-ethyl-5-methylhydantoin; and the like and mixtures thereof.

The amount of microbiocide component released by the present containers or cartridges into the LCMG depends on a number of factors, for example and without limitation, the particular LCMG to be treated, the particular microbe or microbes to be controlled, the extent of microbial growth to be controlled, the configuration and/or size and/or operating conditions of particular system in which the LCMG is used or employed and the like factors. The effective concentration of the microbiocide component in the LCMG may vary over a wide range depending on a number of factors, for example, including one or more of the same factors set forth in this paragraph. Such concentration may range from about 0.0001% or less to about 0.5% by weight or more of the LCMG. Useful microbiocide component concentrations may be in a range of about 0.0001% or about 0.001% to about 0.01% or about 0.1% or about 0.5% by weight of the LCMG.

The present containers or cartridges are advantageously employed separate and apart from engine, such as internal combustion engine, filter housings since such engines often operate at elevated temperatures sufficient to control microbe growth without the need of a microbiocide component.

The containers or cartridges of the present invention can be placed in a LCMG filter, either upstream or downstream of the filter medium, or it can be placed in the system in which the LCMG is used or employed separate and apart (spaced apart) from the LCMG filter, or it can be provided in a substantially fixed position in the LCMG line, either upstream or downstream of a LCMG filter. Release of a microbiocide component into the LCMG is governed, at least in part, by one or more of membrane pore size, membrane thickness, membrane composition, surface area of the membrane, viscosity of liquid microbiocide component, surface tension and membrane wetting ability of the microbiocide component and/or LCMG, LCMG system operating conditions, such as temperature, pressure and the like, and the like factors.

The invention will now be described with reference to certain examples, which illustrate but do not limit it.

EXAMPLE 1

Referring now to FIG. 1, container 10 comprises a PVC casing 12 including a solid, open ended, generally cylindrically shaped casing body 13 and an end cap 14, which are fitted onto the casing body using a pair of pegs 16, inwardly extending from an end 17 of the cap 14, fitted into an annular groove 18 in the outer sidewall 19 of the casing body. The casing body 13 has an open end 20 and an opposing closed end 21. The casing 12 defines a hollow interior 22.

Provided within the hollow interior 22 are particles 24 containing only a microbiocide component. No other additive is included within the hollow interior 22. The microbiocide component, for example, 2,2-dibromo-3-nitrilonproprionamide (DBNPA), is effective to control, for example, substantially prevent, microbial growth in the coolant composition in contact with the container 10. Such coolant composition, for example, an aqueous-based liquid coolant used in a cooling tower, is susceptible to unwanted microbial growth in use, and is therefore a LCMG.

A porous membrane 27 is adhered to the inner wall 28 of the end capt 14 and covers an opening 30 provided in the end cap. The membrane 27 is made of cellulose nitrate and has an average pore size in a range of about 20 to about 25 microns. The benzyltriazole release flux rate, as defined herein, is about 0.049 mg/hr/min$^2$. The adhesive used to adhere the membrane 27 to the end capt 14 is such as to be insoluble and remain effective as an adhesive in the LCMG to which the membrane is to be exposed. The adhesive should also be compatible with such LCMG and microbiocide present in container 10, for example, have no significant or undue detrimental effect on such LCMG or on the microbiocide or on the other components of container 10. Examples of useful adhesives include, without limitation, epoxy resins; phenolic resins; acrylic resins; cyanoacrylate resins; silicone adhesives; polyurethane adhesives; hot melt adhesives, such as poly(ethylene vinyl acetate (EVA)), polyamide resins, polyester resins and the like; contact adhesives, such as those based on rubber, styrene resins and the like; and the like and combinations thereof.

The container 10 may be placed in a bag or other protective enclosure or packaging for shipment/storage.

The opening 30 in end capt 14 may have a diameter which varies over a relatively wide range, for example in a range of about 1 mm or less to about 50 mm or 80 mm or more. In one embodiment, the opening has a diameter in a range of about 2 mm to about 20 mm or about 40 mm, for example, about 8 mm to about 10 mm. Of course, the opening need not be circular, but can be other shapes, for example, square, rectangular, polygonal, etc. Advantageously, openings with other than circular configurations may have areas which substantially correspond to circular openings having diameters as noted herein; in particular, in a range of about 0.7 mm² or less to about 2000 mm² or 5000 mm² or more; or about 3.2 mm² to about 350 mm² or about 1250 mm², or about 50 mm² to about 80 mm². The opening 30 in the end capt 14 permits infiltration of coolant composition and contact with the porous membrane 27 in the casing 12. Release of the microbiocide component from the particles 24 through the membrane 27 by diffusion permits incorporation of the microbiocide component into the coolant composition (LCMG) and its circulation throughout the coolant system, that is the cooling tower system.

LCMG-permeable, porous membrane 27 is effective to be wetted by the coolant composition (LCMG) and to permit microbiocide component from particles 24 to exit container 10.

In addition, a removable plug 32 is located in port 34 of casing body 13. The plug 32 is structured to be removed to allow water or LCMG to be introduced directly through port 34 into the hollow interior 22 of the casing 12 to contact and wet the particles 24 of microbiocide component contained therein. Such water or LCMG introduction directly into the hollow interior 22 is particularly advantageous in situations in which the microbiocide component is resistant to being wetted by the LCMG in contact with the container 10. Other means for introducing water or LCMG into the hollow interior 22 to achieve such pre-wetting of the microbiocide component may be employed. For example, water or LCMG can be injected into the hollow interior 22 through a needle or similar device. Other systems for passing water or LCMG through the membrane into the hollow interior 22 may be employed. In the event such other means of pre-wetting the microbiocide component in hollow interior 22 are employed or no pre-wetting of the microbiocide component is desired, the casing body 13 need not include port 34 and plug 32.

For a container 10, six (6) inches in length having a 1.5 inch inner diameter, the amount of microbiocide component particles 24 inside the casing is about 186 mL or about 175 g. Release of effective amounts of microbiocide component starts in less than about 24 hours.

In one embodiment, the container 10 is structured so as not to be refillable with microbiocide component. For example, and without limitation, the casing body 13, may be made of a lightweight and/or thin polymeric material, such as a thermalplastic polymeric material, which is flexible and/or sufficiently deformable so that, as the microbiocide component is released from the casing body into the LCMG, the casing body collapses, and remains collapsed. Such a collapsible casing body effectively prevents the refilling of the casing body with microbiocide.

Such a collapsible casing body is a substantial safety feature in accordance with the present invention. Thus, microbiocides are often toxic, for example, as particles in an undiluted state, so that great care must be taken in handling such materials to avoid serious harm to the person or people handling the microbiocide. By using a collapsible casing or casing body, it becomes clearly evident that such collapsed casing or casing body cannot be refilled with microbiocide. Therefore, the user does not even attempt to refill the casing with microbiocide, and, therefore, avoids the danger or risk of being seriously harmed or injured by the microbiocide.

EXAMPLE 2

Figure 2:
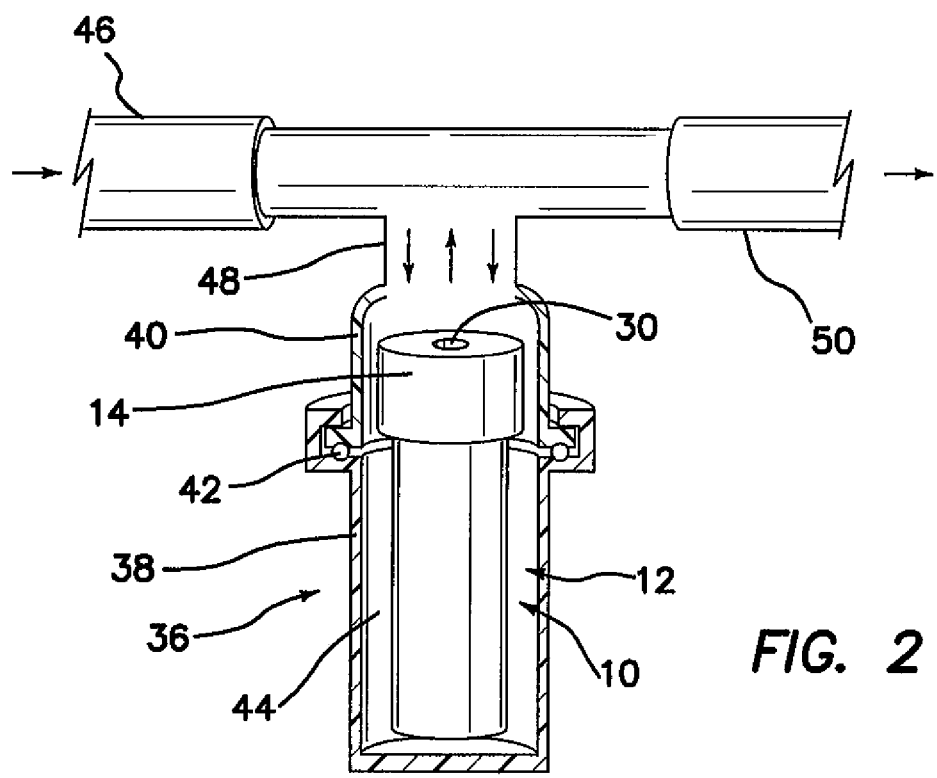
FIG. 2 is a schematic illustration showing the container of FIG. 1 in use in conjunction with a LCMG line.

As shown in FIG. 2, container 10 is positioned in vertical alignment with cylindrical housing 36 provided in a "bypass" configuration with a coolant system, for example, a cooling tower system. A representative diameter for the opening 30 in end capt 14 is 9 mm. As shown, housing 36 includes a housing body 38 and a housing top 40 which interlock to secure the container 10 within the housing 36. A housing O-ring seal 42 is provided between housing body 38 and housing top 40 to seal the interior space 44 of housing 36.

Coolant (LCMG) flows from inlet line 46, enters and exits housing 36 through pipe segment 48, and exits via exit line 50. While inside housing 36, coolant passes in and out of opening or orifice 30, wetting membrane 27 and causing the release, for example, through diffusion, of microbiocide component from the particles 24 in casing 12 into the coolant. Generally, coolant (LCMG) flows into the inlet line 46 by the action of a coolant pump (not shown) of the coolant system, it being understood that gravity may also play a role. In addition, a coolant filter element (not shown), for example, of conventional and well known design, may be located in exit line 50. It is understood that such filter element could alternatively be located in inlet line 46. Such alternative is included within the scope of the present invention.

In addition, as shown in FIG. 2, the container 10 is situated in the housing 36 with the opening or orifice 30 facing upward, toward the pipe segment 48. Such an upward orientation is particularly useful if the particles 24 are coated and/or otherwise include a delayed release component to control or at least assist in controlling the release of the microbiocide component from the container. Alternately the container 10 can be situated in the housing 36 so that the opening or orifice 30 is facing downward or away from the pipe segment 48. This downward orientation is useful when the microbiocide in the particles 24 is not coated or combined with a delayed release component. Both the upward and downward orientations of the container 10, as well as sideto-side and other orientations of container 10, are included within the scope of the present invention.

EXAMPLE 3

Turning now to FIG. 3, an additional container 110 of the present invention is shown. Except as expressly described herein, additional container 110 is structured and functions substantially similarly to container 10.

The container 110 generally comprises a bowl-shaped, LCMG-impermeable casing body 113 having a hollow interior 122 filled with particles 124 of a United States Food and Drug Administration (FDA) registered microbiocide composition, for example and without limitation, DBNPA and one or more additives effective, when released into a coolant to benefit the coolant and/or coolant system. The casing body 113 has a relatively wide open top end 120 which is, for example and without limitation, circular in shape, and an opposing closed end 121. The container 110 further comprises a cap member 114 disposed across, and preferably substantially completely covering, the open end 120.

The container 110 is useful in a coolant (LCMG) line or a coolant sump, for example, of a cooling tower system (not shown). For example, container 110 may be placed in the coolant line, for example, in a manner analogous to that shown in FIG. 2, or in a coolant sump.

In the container 110 shown in FIG. 3, the cap member 114 is removably secured to the casing body 113 in order to allow for filling and/or refilling of the container 110 with the particles 124 of microbiocide composition. As shown, the cap member 114 may be recessed from a periphery, or rim 118, of the casing body 113.

The cap member 114 may be secured to an interior surface 60 of the casing body 113 by means of a resilient O-ring 62 or the like.

The cap member 114 includes at least one opening 130, preferably a plurality of openings 130, for example, four inlets 130 in the embodiment in FIG. 3, to allow a liquid coolant composition (LCMG) in contact with the container 110 to wet the porous membrane layers or pads 127. In this embodiment, the membrane layers 127 are made of cellulose nitrate having a pore size of about 8 microns, and a benzyl-triazole release flux rate, as defined herein, of about 0.025 mg/hr./mm$^2$.

The membrane filter member layers or pads are adhered to inner wall 128 of the cap member 114. Each layer or pad 127 covers a different opening 130 provided in the end cap. The adhesive used may be as described elsewhere herein. The membrane layers or pads 127 are provided for controlling release of the microbiocide composition from particles 124 into the coolant.

In addition, a removable plug 132 is located in port 134 of cap member 114. The plug 132 is structured to be removed to allow water or LCMG to be introduced directly through port 134 into the hollow interior 122 of the casing 112 to contact and wet the particles 124 of microbiocide composition contained therein. Such water or LCMG introduction directly into the hollow interior 122 is particularly advantageous in situations in which the microbiocide composition is resistant to being wetted by the LCMG in contact with the container 110.

Container 110 functions in a manner substantially analogous to container 10, and is effective to release microbiocide composition from the container into the coolant (LCMG). A coolant pump and a coolant filter element may be employed in this embodiment in a manner analogous to that described in Example 2.

EXAMPLE 4

FIGS. 4 and 5 show another container 210 of the present invention that, except as expressly described herein, is structured and functions substantially similarly to containers 10 and 110.

The container 210 generally comprises a bowl-shaped casing body 213 defining a hollow interior 222 for containing particles 224 of a U.S. FDA registered microbiocide component. In addition, an aluminum plate member 214 is secured to the inner wall 70 of casing body 213 for retaining the microbiocide component particles 224 within the casing 212. The aluminum plate member 214 includes a plurality of openings 230, for example, four openings 230 as shown in FIGS. 4 and 5. The four openings 230 are arranged in a configuration similar to how the four openings 130 in container 110 are arranged.

Four individual support structures 80 are secured to plate member 214 directly below each of the openings 230. Each of these structures 80 has a through opening 82 and, together with the plate member 214, defines a compartment sized to accommodate a porous membrane segment 227 between the plate member 214 and the through opening 82. The porous membrane segments 227 are, thus, press fitted to plate member 214. Each of the membrane segments 227 covers a different one of the openings 230.

In addition, a removable plug 232 is located in port 234 of casing 212. The plug 232 is structured to be removed to allow water or LCMG to be introduced directly through port 234 into the hollow interior 222 of the casing 212 to contact and wet the particles 224 of microbiocide component contained therein. Such water or LCMG introduction directly into the hollow interior 222 is particularly advantageous in situations in which the microbiocide component is resistant to being wetted by the LCMG in contact with the container 210.

Container 210 can be used in a manner analogous to containers 10 and 110, and functions and is effective to release microbiocide component from the hollow interior 222 into the coolant (LCMG). A coolant pump and a coolant filter element may be employed in this embodiment in a manner analogous to that described in Example 2.

EXAMPLE 5

Figure 6:
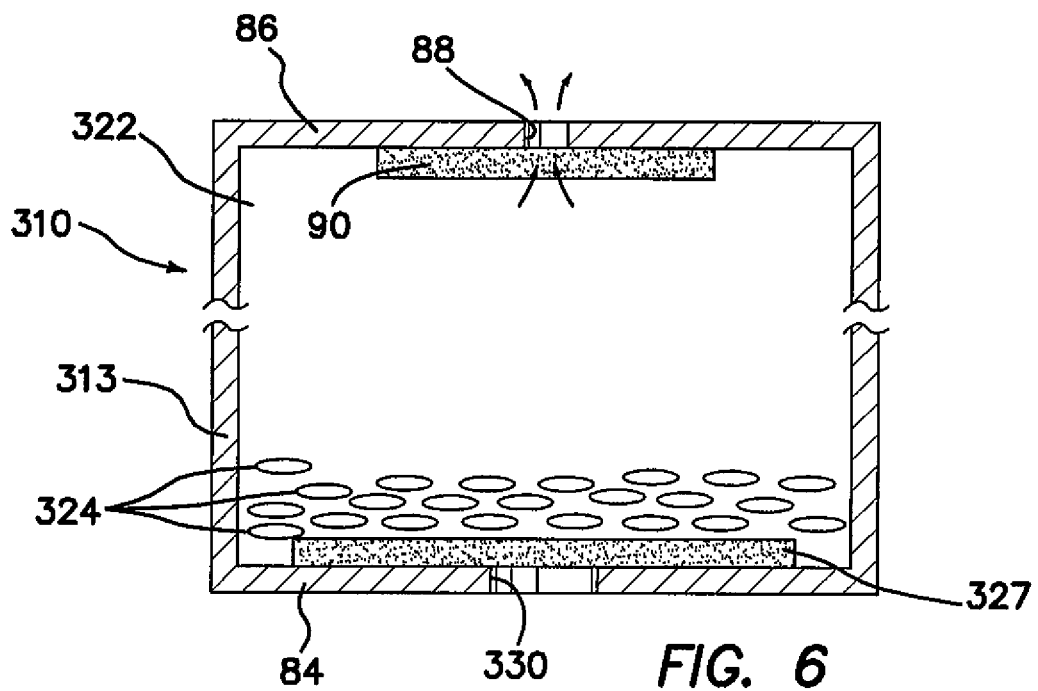
FIG. 6 is a somewhat schematic view of a further embodiment of a microbiocide container in accordance with the present invention.

FIG. 6 shows a further container 310 of the present invention that, except as expressly described herein, is structured and functions substantially similarly to containers 10, 110, 210. The somewhat schematic character of FIG. 6 is meant to illustrate the distinguishing features of further container 310.

The container 310 generally comprises an elongated, cyclindrical casing body 313 defining a hollow interior 322 for containing particles 324 of a U.S. FDA registered microbiocide component.

The casing body 313 includes a first end wall 84 defining a relatively large opening 330. A membrane filter member layer or pad 327 covers the opening 330 and is secured in place, that is secured to first end wall 84, by an adhesive, as described elsewhere herein.

The casing body 313 includes an opposing, second end wall 86 defining a relatively-smaller second opening 88. A further membrane filter member layer or pad 90 covers the second opening 88, and is secured in place, that is secured to second end wall 86, by an adhesive, as described elsewhere herein.

The ratio of the size or area of opening 330 to the size or area of second opening 88 may be in a range of about 2 or about 4 to about 12 or about 20, for example, about 10. In one embodiment, the ratio of the size or area of opening 330 to the size or area of the second opening 88 may be at least about 5. The ratio of the porosity of the membrane layer or pad 327 to the porosity of the further membrane layer or pad 90 may be in a range of about 1 or about 2 to about 10 or about 15.

The combination of the size of second opening 88 and the properties, for example, porosity, material type, electrical charge and the like, of the further membrane layer or pad 90 is such to allow air to escape the hollow interior 322 through second opening 88, and to substantially prevent liquid, such as water, aqueous based-liquid, LCMG and the like, from entering the hollow interior 322 through second opening 88.

Container 310 may be placed in a LCMG with the opening 330 below second opening 88, or with the opening 330 located downstream of second opening 88 in the event the LCMG is flowing across container 310. As the container 310 becomes immersed in the LCMG, the LCMG passes through opening 330 and membrane layer or pad 327 into the hollow interior 322. As the LCMG is so introduced into the hollow interior 322, air from inside the hollow interior exits through further membrane layer or pad 90 and second opening 88. The LCMG and microbiocide component 324 in the hollow interior 322 is substantially prevented from passing through further membrane layer or pad 90 and second opening 88.

Container 310 functions in a manner similar to container 10 to effectively release the microbiocide component from the container through opening 330 into the LCMG in which container 30 is present.

Since container 310 is structured to allow liquid to enter the hollow interior, the microbiocide component is effectively wetted by the liquid, which wetting may be advantageous to facilitating a controlled or consistent, for example, substantially constant, rate of release of the microbiocide component into the LCMG.

EXAMPLE 6

Figure 7:
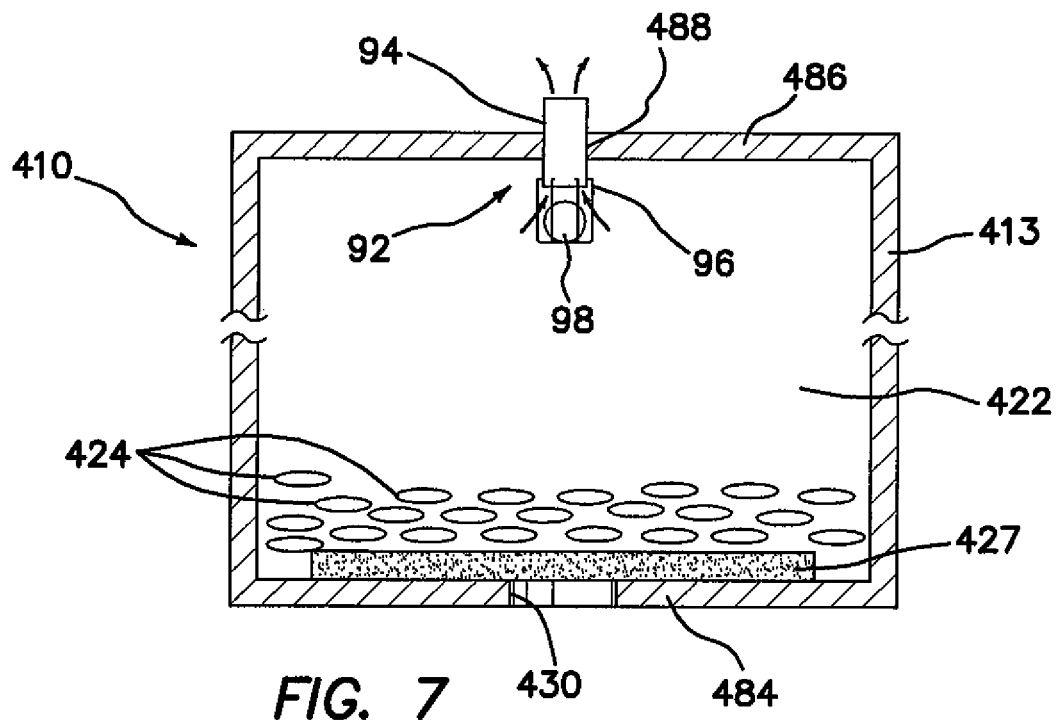
FIG. 7 is a somewhat schematic view of a valved embodiment of a microbiocide container in accordance with the present invention.

FIG. 7 shows a valved container 410 of the present invention that, except as expressly described herein, is structured and functions substantially similarly to containers 10, 110, 210 and 310. The somewhat schematic character of FIG. 7 is meant to illustrate the distinguishing features of valved container 410.

The valved container 410 generally comprises an elongated cylindrical casing body 413 defining a hollow interior 322 for containing particles 324 of an U.S. FDA registered microbiocide component.

The casing body 413 includes a first end wall 484 defining a relatively large opening 430. A membrane filter medium layer or pad 427 covers the opening 430 and is secured in place, that is secured to first end wall 484, by an adhesive, as described elsewhere herein. The membrane layer or pad 427 is structured and functions similarly to membrane pad or layer 327.

The casing body 413 includes an opposing, second end wall 486 defining a second opening 488. A ball float valve, shown generally at 92, includes a valve port or conduit 94, a valve housing 96 and a ball 98 within the housing. The valve conduit 94 and valve housing 96 are secured together. The valve housing 96 and ball 98 are located internally within the casing body 413. The valve conduit 94 is secured, for example, interference fitted and/or by the use of an adhesive, to the casing body 413. As shown in FIG. 7, the valve 92 is operatively coupled to second opening 488, and is separate and spaced apart from, and not operatively coupled to, opening 430 and membrane layer or pad 427.

Container 410 may be placed in a LCMG with the opening 430 below second opening 488, or with the opening 430 located downstream of second opening 488 in the event the LCMG is flowing across container 310. As the container 410 becomes immersed in the LCMG, the LCMG passes through valve conduit 94 and opening 430 and membrane layer or pad 327 into the hollow interior 422. As LCMG is so introduced into the hollow interior 422, air from inside the hollow interior exits through valve conduit 94. Once the LCMG level in the hollow interior 422 reaches a level about equal to that of the ball 98, the ball will float up against the valve conduit 94 and close the valve 92 to substantially prevent any flow of material into or out of hollow interior 422 across valve 92. Thus, the LCMG and microbiocide component 424 in the hollow interior 422 is substantially prevented from passing out of hollow interior 422 across valve 92

Container 410 functions in a manner similar to container 310 to effectively release the microbiocide component (composition) from the container through opening 330 into the coolant (LCMG).

Since container 410 is structured to allow liquid to enter the hollow interior, the microbiocide component is effectively wetted by the liquid, which wetting may be advantageous in facilitating a controlled or consistent, for example, substantially constant, rate of release of the microbiocide component into the coolant (LCMG).

EXAMPLE 7

Figure 8:
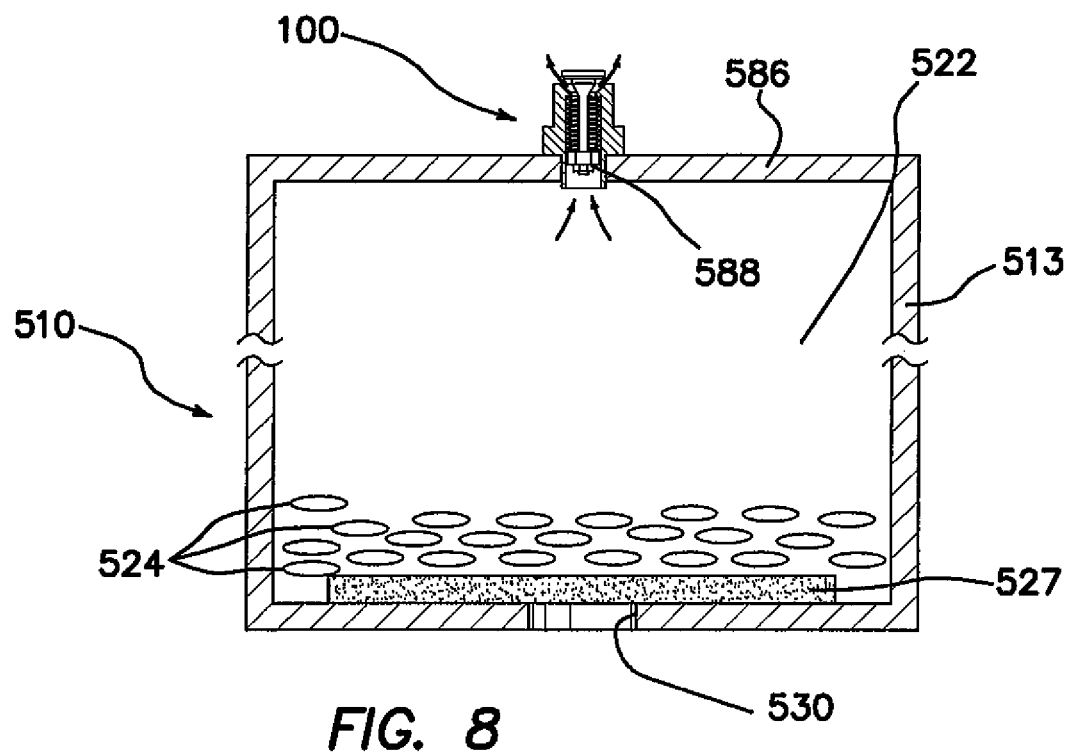
FIG. 8 is a somewhat schematic view of a further valued embodiment of a microbiocide container in accordance with the present invention

FIG. 8 shows a further valved container 510 of the present invention, that except as expressly described herein, is structured and functions substantially similarly to containers 10, 110, 210, 310 and 410. In particular, except as expressly described herein, valved container 510 is structured and functions similarly to valved container 410. The somewhat schematic character of FIG. 7 is meant to illustrate the distinguishing features of the further valved container 510.

The primary difference between valved container 510 and valved container 410 is the inclusion of a spring valve, shown generally as 100, is included, rather than the ball float valve 92 of valved container 410.

Spring valve 100 is situated largely external of casing body 513 and is in fluid communication with hollow interior 522 through second opening 588 in opposing second end wall 586.

EXAMPLE 8

Figure 9:
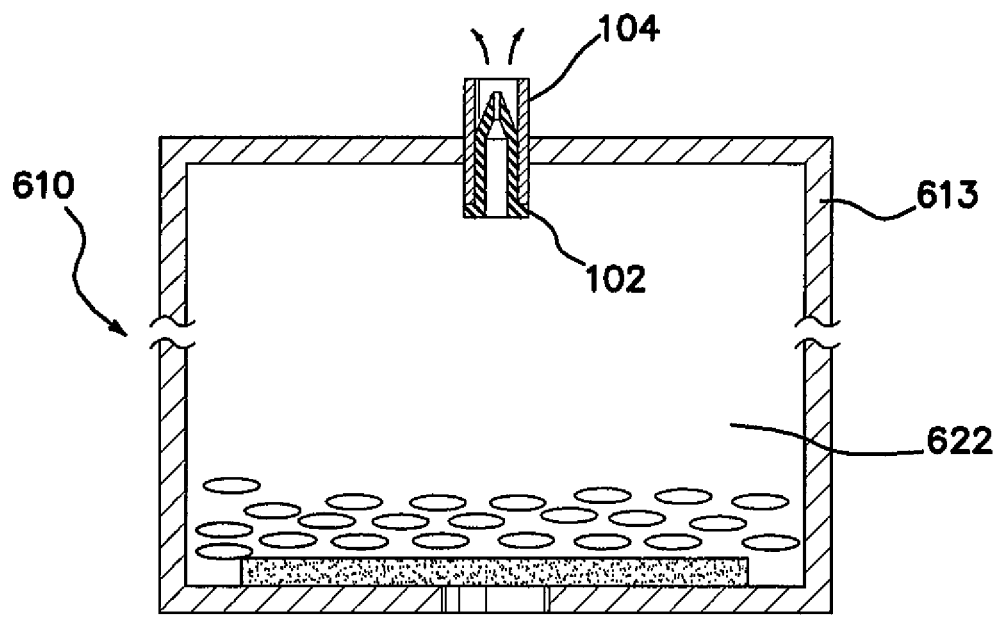
FIG. 9 is a somewhat schematic view of an additional valved embodiment of a controlled release system for a potability additive component in accordance with the present invention.

FIG. 9 shows an additional valved controlled release system 610 of the present invention. Except as expressly described herein, additional valved system 610 functions similarly to controlled release systems 10, 110, 210, 310, 410 and 510. In particular, except as expressly described herein, valved controlled release system 610 is structured and functions similarly to valved system 410, with the primary difference being that ball float valve 92 in system 410 has been replaced by a one-piece high precision valve, specifically a duckbill valve 102. Duckbill valve 102 is sealed to a suitable valve housing 104 which is fitted, for example friction fitted, to casing body 614.

Duckbill valve 102 in this example is a one-piece, molded elastomeric duckbill valve that is open when there is a positive differential pressure in hollow interior 622 of casing body 613 relative to the exterior of the casing body 613. As water fills hollow interior 622, air passes freely through open duckbill valve 102. Once the hollow interior 622 is filled with water and the system 610 is fully immersed in water, pressure is equalized between hollow interior 622 and the exterior of casing body 613, causing duckbill valve to close to flow of material into or out of the hollow interior 622.

Duckbill valves suitable for use in the present systems are commercially available, for example, from Vernay Laboratories, Inc., having corporate headquarters located in Yellow Springs, Ohio.

While the present invention has been described with respect to various specific examples and embodiments, it is to be understood that the invention is not limited thereto and that it can be variously practiced within the scope of the following claims.

What is claimed is:

1. A container for releasing a microbiocide component in a liquid composition susceptible to unwanted microbial, growth, the container comprising:

a casing, not part of an internal combustion engine filter housing, impermeable to a liquid composition susceptible to unwanted microbial growth, and defining a hollow interior, at least one opening through which liquid enters and exits the casing and a further opening spaced apart from the at least one opening;

a microbiocide component located in the hollow interior of the casing;

at least one liquid permeable element covering the at least one opening of the casing and spaced apart from the further opening which is not covered by a liquid permeable element, the at least one liquid permeable element being effective to provide for controlled release of the microbiocide component through the at least one opening into a liquid composition susceptible to unwanted microbial growth external from the casing; and a ball float valve including a valve housing secured to the further opening in the casing, the valve having an open position and a different closed position, the valve moves, while the container is immersed in a liquid composition susceptible to unwanted microbial growth and a liquid composition susceptible to unwanted microbial growth is present in the hollow interior of the casing, in response to the level of a liquid composition susceptible to unwanted microbial growth in the casing, between the open position to allow air to pass out of the hollow interior across the valve through the further opening and the different closed position to substantially prevent any flow of material from passing out of the hollow interior across the valve through the further opening.

2. The container of claim 1, wherein the valve in the open position allows a liquid composition susceptible to unwanted microbial growth to pass into the hollow interior through the further opening.

3. The container of claim 1, wherein the at least one liquid permeable element comprises a membrane secured to the container.

4. The container of claim 1, which is structured to be not refillable with microbiocide component.

5. The container of claim 1, wherein the microbiocide component is provided in a particulate form.

6. The container of claim 1, wherein the valve is located in the hollow interior.

7. The container of claim 1, wherein the microbiocide component substantially the only active material present in the hollow interior of the casing.

8. A container for releasing a microbiocide component in a liquid Composition susceptible to unwanted microbial growth, the container comprising:

a casing, not part of an internal combustion engine filter housing, impermeable to a liquid composition suscetible to unwanted microbial growth, and defining a hollow interior, at least one opening through which liquid enters and exits the casing and a further opening spaced apart from the at least one opening;

a microbiocide component located in the hollow interior of the casing;

at least one liquid permeable membrane element covering the at least one opening of the casing and spaced apart from the further opening which is not covered by a liquid permeable element, the at least one liquid permeable membrane element being effective to provide for releasee of the mictobiocide component through the at least one opening into a, liquid composition susceptible to unwanted microbial growth external from the casing; and a ball float valve including a valve housing secured to the further opening in the casing, the valve having an open position and a different closed position, the valve moves, while the container is immersed in a liquid composition susceptible to unwanted microbial growth and a liquid composition susceptible to unwanted microbial growth is present in the hollow interior of the casing, in response to the level of a liquid composition susceptible to unwanted microbial growth in the casing between the open position to allow air to pass out of the hollow interior across the valve through the further opening and the different closed position to substantially prevent any flow of material into or out of the hollow interior across the valve through the further opening.

9. The container of claim 8, wherein the at least one liquid permeable membrane element comprises a membrane secured to the container.

10. The container of claim 8, which is structured to at least partially collapse as the microbiocide component is released from the hollow interior of the casing.

11. The container of claim 8, which is structured to be not refillable with microbiocide component.

12. The container of claim 8, wherein the microbiocide component is substantially the only active material present in the hollow interior of the casing.

13. A container for releasing a microbiocide component in a liquid composition susceptible to unwanted microbial growth, the container comprising:

a casing, not part of an internal combustion engine filter housing, impermeable to a liquid composition susceptible to unwanted microbial growth and defining a hollow interior, at least one opening and a further opening spaced apart from the at least one opening;

a microbiocide component located in the hollow interior of the casing;

at least one liquid permeable membrane covering the at least one opening of the casing and spaced apart from the further opening which is not covered by a liquid permeable element, the at least one liquid permeable membrane being effective to provide controlled release of the microbiocide component from the hollow interior through the at least one opening into a liquid composition susceptible to unwanted microbial growth external from the casing; and a ball float valve operatively coupled to the further opening, the ball float valve being structured to move, while the container is immersed in a liquid composition susceptible to unwanted microbial growth, in response to the level of a liquid composition susceptible to unwanted microbial growth in the casing between a first position to allow a liquid composition susceptible to unwanted microbial growth to pass into the hollow interior across the ball float valve through the further opening to facilitate release of the microbiocide component into a liquid composition susceptible to microbial growth external from the casing, and a different second position to substantially prevent a liquid composition susceptible to unwanted microbial growth from passing out of the hollow interior across the valve through the further opening.

14. The container of claim 13, wherein the microbiocide component is substantially the only active material present in the hollow interior of the casing.

15. A method of treating a liquid composition susceptible to unwanted microbial growth, the method comprising:

placing a container in contact with a liquid composition susceptible to unwanted microbial growth, the container comprising; a casing, not part of an internal combustion engine filter housing, impermeable to the liquid composition susceptible to unwanted microbial growth, and defining a hollow interior, at least one opening through which liquid enters and exits the casing and a further, opening spaced apart from the at least one opening; a microbiocide component located in the hollow interior of the casing; at least one liquid permeable element covering the at least one opening of the casing and spaced apart from the further opening, the at least one liquid permeable element being effective to provide for controlled release of the microbiocide component through the at least one opening into a liquid composition susceptible to unwanted microbial growth external from the casing; and a valve including a valve housing secured to the further opening in the casing, the valve having an open position and a different closed position;

passing a quantity of liquid composition susceptible to unwanted microbial growth into the hollow interior of the casing;

passing liquid composition susceptible to unwanted microbial growth and microbiocide component out of the hollow interior through the at least one liquid permeable element, thereby releasing the microbiocide component into the liquid composition susceptible to unwanted microbial growth external from the casing to treat said liquid composition; and in response to the level of the liquid, composition susceptible to unwanted microbial growth inthe hollow interior of the casing, moving the valve between the open position to allow air to pass out of the hollow interior across the valve through the further opening and the closed position to substantially prevent any flow of material from passing out of the hollow interior across the valve through the further opening.

16. The method of claim 15, wherein the valve in the open position allows a liquid composition susceptible to unwanted microbial growth to pass into the hollow interior through the further opening 17. The method of claim 15, wherein the at least one liquid permeable element comprises a membrane secured to the container.

18. The method of claim 15, wherein the container is structured to be not refillable with microbiocide component.

19. The methoiciof claim 15, wherein the microbiocide component is provided in a particulate form.

20. A method claim 15, wherein the passing liquid composition susceptible to unwanted microbial growth and microbiocide component out of the hollow interior through the at least one liquid permeable element is effective in controllably releasing the microbiocide component into the liquid composition susceptible to unwanted microbial growth external from the casing.

* * * * *